(12) United States Patent
Brooks et al.

(10) Patent No.: US 9,508,067 B2
(45) Date of Patent: *Nov. 29, 2016

(54) SYSTEM, PROGRAM PRODUCT AND METHODS FOR RETAIL ACTIVATION AND RELOAD ASSOCIATED WITH PARTIAL AUTHORIZATION TRANSACTIONS

(71) Applicant: METABANK, Sioux Falls, SD (US)

(72) Inventors: Jason Brooks, Atlanta, GA (US); Mike Wells, Flowery Branch, GA (US)

(73) Assignee: Metabank, Sioux Falls, SD (US)

( * ) Notice: Subject to any disclaimer, the term of this patent is extended or adjusted under 35 U.S.C. 154(b) by 562 days.

This patent is subject to a terminal disclaimer.

(21) Appl. No.: 13/849,925

(22) Filed: Mar. 25, 2013

(65) Prior Publication Data

US 2013/0218695 A1    Aug. 22, 2013

Related U.S. Application Data

(63) Continuation of application No. 12/554,432, filed on Sep. 4, 2009, now Pat. No. 8,403,211.

(60) Provisional application No. 61/148,752, filed on Jan. 30, 2009, provisional application No. 61/118,127, filed on Nov. 26, 2008, provisional application No. 61/110,332, filed on Oct. 31, 2008, provisional application No. 61/094,335, filed on Sep. 4, 2008.

(51) Int. Cl.
*G06Q 20/00* (2012.01)
*G06Q 40/00* (2012.01)
(Continued)

(52) U.S. Cl.
CPC ............ *G06Q 20/227* (2013.01); *G06Q 20/20* (2013.01); *G06Q 20/354* (2013.01)

(58) Field of Classification Search
CPC .... G06Q 20/20; G06Q 20/28; G06Q 20/354; G07F 7/08
USPC .............................. 235/375, 380; 705/17, 44
See application file for complete search history.

(56) References Cited

U.S. PATENT DOCUMENTS 3,752,904 A    8/1973   Waterbury
4,247,759 A    1/1981   Yuris et al.
(Continued)

FOREIGN PATENT DOCUMENTS

EP    0397512 A2    11/1990
EP    0619565 A1    10/1994
(Continued)

OTHER PUBLICATIONS

Final Office Action for co-pending U.S. Appl. No. 12/389,749 dated Dec. 11, 2014.
(Continued)

*Primary Examiner* — Laura Gudorf
(74) *Attorney, Agent, or Firm* — Bracewell LLP

(57) ABSTRACT

Systems, program product, apparatus and method for transmitting and processing the sale of a transaction card product over an existing payment network using partial authorization messaging, are provided. An example of such a system can include a merchant POS apparatus equipped to support partial authorization messaging, a transaction card issuer server in communication therewith, and a transaction card product. The transaction card product can include a conventional transaction card securely wrapped within a tamper evident container that can carry its own magnetic strip. The container magnetic strip can store an assigned unique card identifier linked to, but different from, the card identifier normally associated with the card. The container card identifier stored in the container magnetic strip is compatible with the merchant POS card reader and is usable to activate the card without the merchant or consumer having access to the card, the card identifier, or the card magnetic strip.

11 Claims, 12 Drawing Sheets

(51) Int. Cl.
  *G06K 5/00* (2006.01)
  *G06Q 20/22* (2012.01)
  *G06Q 20/20* (2012.01)
  *G06Q 20/34* (2012.01)

(56) References Cited

U.S. PATENT DOCUMENTS

| | | |
|---|---|---|
| 4,334,307 A | 6/1982 | Bourgeois et al. |
| 4,439,636 A | 3/1984 | Newkirk et al. |
| 4,449,040 A | 5/1984 | Matsuoka et al. |
| 4,528,643 A | 7/1985 | Freeny, Jr. |
| 4,532,416 A | 7/1985 | Berstein |
| 4,577,061 A | 3/1986 | Katzeff et al. |
| 4,625,276 A | 11/1986 | Benton et al. |
| 4,677,565 A | 6/1987 | Ogaki et al. |
| 4,678,895 A | 7/1987 | Tateisi et al. |
| 4,706,275 A | 11/1987 | Kamal |
| 4,722,054 A | 1/1988 | Yorozu et al. |
| 4,727,243 A | 2/1988 | Saver |
| 4,750,201 A | 6/1988 | Hodgson et al. |
| 4,797,540 A | 1/1989 | Kimizu |
| 4,827,113 A | 5/1989 | Rikuna |
| 4,868,900 A | 9/1989 | McGuire |
| 4,877,947 A | 10/1989 | Mori |
| 4,879,744 A | 11/1989 | Tasaki et al. |
| 4,884,212 A | 11/1989 | Stutsman |
| 4,951,308 A | 8/1990 | Bishop et al. |
| 4,968,873 A | 11/1990 | Dethloff et al. |
| 5,012,077 A | 4/1991 | Takano |
| 5,048,085 A | 9/1991 | Abraham et al. |
| 5,050,207 A | 9/1991 | Hitchcock |
| 5,068,891 A | 11/1991 | Marshall |
| 5,101,098 A | 3/1992 | Naito |
| 5,138,650 A | 8/1992 | Stahl et al. |
| 5,146,067 A | 9/1992 | Sloan et al. |
| 5,148,481 A | 9/1992 | Abraham et al. |
| 5,151,582 A | 9/1992 | Fujioka |
| 5,155,342 A | 10/1992 | Urano |
| 5,163,086 A | 11/1992 | Ahearn et al. |
| 5,192,947 A | 3/1993 | Neustein |
| 5,220,593 A | 6/1993 | Zicker et al. |
| 5,221,838 A | 6/1993 | Gutman et al. |
| 5,225,666 A | 7/1993 | Amarena et al. |
| 5,264,689 A | 11/1993 | Maes et al. |
| 5,265,155 A | 11/1993 | Castro |
| 5,266,782 A | 11/1993 | Alanara et al. |
| 5,272,320 A | 12/1993 | Hakamada |
| 5,278,752 A | 1/1994 | Narita et al. |
| 5,285,382 A | 2/1994 | Muehlberger et al. |
| 5,327,482 A | 7/1994 | Yamamoto |
| 5,334,821 A | 8/1994 | Campo et al. |
| 5,340,969 A | 8/1994 | Cox |
| 5,352,876 A | 10/1994 | Watanabe et al. |
| 5,359,182 A | 10/1994 | Schilling |
| 5,409,092 A | 4/1995 | Itako et al. |
| 5,416,306 A | 5/1995 | Imahata |
| 5,438,186 A | 8/1995 | Nair et al. |
| 5,442,567 A | 8/1995 | Small |
| 5,448,044 A | 9/1995 | Price et al. |
| 5,465,206 A | 11/1995 | Hilt et al. |
| 5,477,038 A | 12/1995 | Levine et al. |
| 5,504,808 A | 4/1996 | Hamrick, Jr. |
| 5,511,114 A | 4/1996 | Stimson et al. |
| 5,513,117 A | 4/1996 | Small |
| 5,550,358 A | 8/1996 | Tait et al. |
| 5,577,109 A | 11/1996 | Stimson et al. |
| 5,577,121 A | 11/1996 | Davis et al. |
| 5,661,254 A | 8/1997 | Steuer et al. |
| 5,696,908 A | 12/1997 | Muehlberger et al. |
| 5,699,528 A | 12/1997 | Hogan |
| 5,732,136 A | 3/1998 | Murphree et al. |
| 5,814,798 A | 9/1998 | Zancho |
| 5,841,365 A | 11/1998 | Rimkus |
| 5,859,419 A | 1/1999 | Wynn |
| 5,870,721 A | 2/1999 | Norris |
| 5,875,437 A | 2/1999 | Atkins |
| 5,878,141 A | 3/1999 | Daly et al. |
| 5,893,907 A | 4/1999 | Ukuda |
| 5,897,620 A | 4/1999 | Walker et al. |
| 5,920,848 A | 7/1999 | Schutzer et al. |
| 5,923,016 A | 7/1999 | Fredregill et al. |
| 5,933,812 A | 8/1999 | Meyer et al. |
| 5,963,921 A | 10/1999 | Longfield |
| 6,000,608 A | 12/1999 | Dorf |
| 6,012,635 A | 1/2000 | Shimada et al. |
| 6,021,397 A | 2/2000 | Jones et al. |
| 6,032,859 A | 3/2000 | Muehlberger et al. |
| 6,041,308 A | 3/2000 | Walker et al. |
| 6,065,679 A | 5/2000 | Levie et al. |
| 6,112,191 A | 8/2000 | Burke |
| 6,144,948 A | 11/2000 | Walker et al. |
| 6,154,738 A | 11/2000 | Call |
| 6,189,787 B1 | 2/2001 | Dorf |
| 6,208,978 B1 | 3/2001 | Walker et al. |
| 6,249,773 B1 | 6/2001 | Allard et al. |
| 6,253,998 B1 | 7/2001 | Ziamo |
| 6,304,860 B1 | 10/2001 | Martin, Jr. et al. |
| 6,315,193 B1 | 11/2001 | Hogan |
| 6,450,407 B1 | 9/2002 | Freeman et al. |
| 6,467,684 B2 | 10/2002 | Fite et al. |
| 6,704,714 B1 | 3/2004 | O'Leary et al. |
| 6,739,506 B1 | 5/2004 | Constantine |
| 6,793,131 B2 | 9/2004 | Hogan |
| 6,865,544 B1 | 3/2005 | Austin |
| 6,920,434 B1 | 7/2005 | Cossette |
| 6,999,943 B1 | 2/2006 | Johnson et al. |
| 7,010,507 B1 | 3/2006 | Anderson et al. |
| 7,031,939 B1 | 4/2006 | Gallagher et al. |
| 7,072,862 B1 | 7/2006 | Wilson |
| 7,127,452 B1 | 10/2006 | Yashiro |
| 7,177,829 B1 | 2/2007 | Wilson et al. |
| 7,206,761 B2 | 4/2007 | Colvin |
| 7,252,223 B2 | 8/2007 | Schofield |
| 7,258,273 B2 | 8/2007 | Griffin |
| 7,370,076 B2 | 5/2008 | Friedman et al. |
| 7,392,224 B1 | 6/2008 | Bauer et al. |
| 7,398,919 B2 | 7/2008 | Cooper |
| 7,426,492 B1 | 9/2008 | Bishop et al. |
| 7,451,920 B1 | 11/2008 | Rose |
| 7,472,089 B2 | 12/2008 | Hu et al. |
| 7,493,279 B1 | 2/2009 | Kwan |
| 7,509,286 B1 | 3/2009 | Bent et al. |
| 7,546,945 B1 | 6/2009 | Bucci et al. |
| 7,567,936 B1 | 7/2009 | Peckover et al. |
| 7,584,887 B1 * | 9/2009 | Sanchez et al. ............ 235/380 |
| 7,599,879 B2 | 10/2009 | Louie et al. |
| 7,606,918 B2 | 10/2009 | Holzman et al. |
| 7,607,570 B1 | 10/2009 | Constantine |
| 7,628,319 B2 | 12/2009 | Brown et al. |
| 7,653,591 B1 | 1/2010 | Dabney |
| 7,702,583 B1 | 4/2010 | Hamilton et al. |
| 7,702,587 B2 | 4/2010 | Nguyen et al. |
| 7,752,102 B2 | 7/2010 | Thomas |
| 7,757,944 B2 | 7/2010 | Cline et al. |
| 7,783,571 B2 | 8/2010 | Fish et al. |
| 7,792,717 B1 | 9/2010 | Hankins et al. |
| 7,810,735 B2 | 10/2010 | Madani |
| 7,813,955 B2 | 10/2010 | Ariff et al. |
| 7,814,012 B2 | 10/2010 | Johnson |
| 7,856,399 B2 | 12/2010 | Wilkes |
| 7,865,434 B2 | 1/2011 | Sheets |
| 7,873,569 B1 | 1/2011 | Cahn |
| 7,899,750 B1 | 3/2011 | Klieman et al. |
| 7,904,333 B1 | 3/2011 | Perkowski |
| 7,933,833 B2 | 4/2011 | Hotz et al. |
| 7,954,704 B1 | 6/2011 | Gephart et al. |
| 8,024,242 B2 | 9/2011 | Galit |
| 8,046,256 B2 | 10/2011 | Chien et al. |
| 8,051,006 B1 | 11/2011 | Rourk |
| 8,055,557 B2 | 11/2011 | Sorbe et al. |
| 8,065,187 B2 | 11/2011 | Ahlers et al. |
| 8,069,085 B2 | 11/2011 | Ahlers et al. |
| 8,086,494 B2 | 12/2011 | Dooley et al. |
| 8,090,649 B2 | 1/2012 | Galit et al. |

(56) References Cited

U.S. PATENT DOCUMENTS

| | | |
|---|---|---|
| 8,103,549 B1 | 1/2012 | Ahlers et al. |
| 8,108,272 B2 | 1/2012 | Sorbe et al. |
| 8,108,279 B2 | 1/2012 | Galit et al. |
| 8,108,977 B1 | 2/2012 | Miller |
| 8,150,764 B2 | 4/2012 | Crowe et al. |
| 8,175,962 B2 | 5/2012 | Galit et al. |
| 8,175,972 B2 | 5/2012 | Galit et al. |
| 8,190,480 B1 | 5/2012 | Ahlers et al. |
| 8,214,286 B1 | 7/2012 | Galit et al. |
| 8,244,611 B2 | 8/2012 | Galit |
| 8,244,637 B2 | 8/2012 | Galit et al. |
| 8,260,678 B2 | 9/2012 | Miller |
| 8,266,047 B2 | 9/2012 | Galit |
| 8,286,863 B1 | 10/2012 | Brooks |
| 8,290,853 B2 | 10/2012 | Galit |
| 8,296,227 B2 | 10/2012 | Galit et al. |
| 8,301,557 B1 | 10/2012 | Crowe et al. |
| 8,306,912 B2 | 11/2012 | Galit |
| 8,341,021 B2 | 12/2012 | Ahlers et al. |
| 8,355,984 B1 | 1/2013 | Galit et al. |
| 8,371,502 B1 | 2/2013 | Galit et al. |
| 8,386,375 B2 | 2/2013 | Galit |
| 8,392,299 B2 | 3/2013 | Sorbe et al. |
| 8,392,330 B2 | 3/2013 | Sorbe et al. |
| 8,403,211 B2 | 3/2013 | Brooks et al. |
| 8,485,441 B2 | 7/2013 | Brooks |
| 8,494,960 B2 | 7/2013 | Galit et al. |
| 8,538,879 B2 | 9/2013 | Galit et al. |
| 8,589,295 B2 | 11/2013 | Sorbe et al. |
| 8,636,203 B1 * | 1/2014 | Patterson et al. ............. 235/379 |
| 2001/0021925 A1 | 9/2001 | Ukigawa et al. |
| 2001/0034663 A1 | 10/2001 | Teveler et al. |
| 2001/0034676 A1 | 10/2001 | Vasic |
| 2001/0042785 A1 | 11/2001 | Walker et al. |
| 2002/0002075 A1 | 1/2002 | Rowe |
| 2002/0032612 A1 | 3/2002 | Williams et al. |
| 2002/0038285 A1 | 3/2002 | Golden et al. |
| 2002/0042744 A1 | 4/2002 | Kohl |
| 2002/0055904 A1 | 5/2002 | Mon |
| 2002/0055909 A1 | 5/2002 | Fung et al. |
| 2002/0077971 A1 | 6/2002 | Allred |
| 2002/0107797 A1 | 8/2002 | Combaluzier |
| 2002/0111886 A1 | 8/2002 | Chenevich et al. |
| 2002/0138415 A1 | 9/2002 | Siska |
| 2002/0152161 A1 | 10/2002 | Aoike |
| 2002/0194122 A1 | 12/2002 | Knox et al. |
| 2002/0194124 A1 | 12/2002 | Hobbs et al. |
| 2003/0001005 A1 | 1/2003 | Risafi et al. |
| 2003/0004997 A1 | 1/2003 | Parker et al. |
| 2003/0055782 A1 | 3/2003 | Slater |
| 2003/0061170 A1 | 3/2003 | Uzo |
| 2003/0074311 A1 | 4/2003 | Saylors et al. |
| 2003/0097331 A1 | 5/2003 | Cohen |
| 2003/0135459 A1 | 7/2003 | Abelman et al. |
| 2003/0144935 A1 | 7/2003 | Sobek |
| 2003/0158811 A1 | 8/2003 | Sanders et al. |
| 2003/0167225 A1 | 9/2003 | Adams |
| 2003/0191702 A1 | 10/2003 | Hurley |
| 2003/0191714 A1 | 10/2003 | Norris |
| 2003/0197059 A1 | 10/2003 | Tidball et al. |
| 2003/0200118 A1 | 10/2003 | Lee et al. |
| 2003/0208443 A1 | 11/2003 | Mersky |
| 2003/0217003 A1 | 11/2003 | Weinflash et al. |
| 2004/0036215 A1 | 2/2004 | Butler, II |
| 2004/0047459 A1 | 3/2004 | Diaz |
| 2004/0098351 A1 | 5/2004 | Duke |
| 2004/0111370 A1 | 6/2004 | Saylors et al. |
| 2004/0117250 A1 | 6/2004 | Lubow et al. |
| 2004/0117302 A1 | 6/2004 | Weichert et al. |
| 2004/0133515 A1 | 7/2004 | McCoy et al. |
| 2004/0143527 A1 | 7/2004 | Benkert et al. |
| 2004/0148252 A1 | 7/2004 | Fleishman |
| 2004/0153407 A1 | 8/2004 | Clubb et al. |
| 2004/0167821 A1 * | 8/2004 | Baumgartner .................. 705/17 |
| 2004/0199463 A1 | 10/2004 | Deggendorf |
| 2004/0210484 A1 | 10/2004 | Lee |
| 2004/0211830 A1 | 10/2004 | Algiene |
| 2004/0215554 A1 | 10/2004 | Kemper et al. |
| 2004/0225545 A1 | 11/2004 | Turner et al. |
| 2004/0230523 A1 | 11/2004 | Johnson |
| 2004/0235542 A1 | 11/2004 | Stronach et al. |
| 2004/0236646 A1 | 11/2004 | Wu et al. |
| 2004/0249752 A1 | 12/2004 | Prato et al. |
| 2005/0004839 A1 | 1/2005 | Bakker et al. |
| 2005/0015332 A1 | 1/2005 | Chen |
| 2005/0021363 A1 | 1/2005 | Stimson et al. |
| 2005/0071230 A1 | 3/2005 | Mankoff |
| 2005/0075939 A1 | 4/2005 | Bao et al. |
| 2005/0077350 A1 | 4/2005 | Courtion et al. |
| 2005/0082364 A1 | 4/2005 | Alvarez et al. |
| 2005/0108121 A1 | 5/2005 | Gravett et al. |
| 2005/0167481 A1 | 8/2005 | Hansen et al. |
| 2005/0167487 A1 | 8/2005 | Conlon et al. |
| 2005/0173520 A1 | 8/2005 | Jaros et al. |
| 2005/0177489 A1 | 8/2005 | Neff et al. |
| 2005/0177502 A1 | 8/2005 | Thomas |
| 2005/0203837 A1 | 9/2005 | Leigh et al. |
| 2005/0205663 A1 | 9/2005 | Algiene |
| 2005/0228724 A1 | 10/2005 | Frangiosa |
| 2005/0247798 A1 * | 11/2005 | Graves et al. ................. 235/493 |
| 2005/0273430 A1 | 12/2005 | Pliha |
| 2005/0278188 A1 | 12/2005 | Thomson et al. |
| 2005/0278347 A1 | 12/2005 | Wolf et al. |
| 2005/0283436 A1 | 12/2005 | Greer et al. |
| 2005/0289044 A1 | 12/2005 | Breslin et al. |
| 2006/0054682 A1 | 3/2006 | De La Huerga |
| 2006/0059085 A1 | 3/2006 | Tucker |
| 2006/0074804 A1 | 4/2006 | Cinar |
| 2006/0085269 A1 | 4/2006 | Guilfoyle |
| 2006/0085334 A1 | 4/2006 | Murphy |
| 2006/0149665 A1 | 7/2006 | Weksler |
| 2006/0149670 A1 | 7/2006 | Nguyen et al. |
| 2006/0161499 A1 | 7/2006 | Rich et al. |
| 2006/0169784 A1 | 8/2006 | Collins et al. |
| 2006/0190322 A1 | 8/2006 | Oehlerking et al. |
| 2006/0206402 A1 | 9/2006 | Sullivan |
| 2006/0212392 A1 | 9/2006 | Brown |
| 2006/0212393 A1 | 9/2006 | Brown |
| 2006/0224502 A1 | 10/2006 | McGowan |
| 2006/0247975 A1 | 11/2006 | Shapiro et al. |
| 2006/0249570 A1 | 11/2006 | Seifert et al. |
| 2006/0249870 A1 | 11/2006 | Tachauer |
| 2006/0259364 A1 | 11/2006 | Strock et al. |
| 2006/0259957 A1 | 11/2006 | Tam et al. |
| 2006/0282356 A1 | 12/2006 | Andres et al. |
| 2006/0282374 A1 | 12/2006 | Stone |
| 2006/0293966 A1 | 12/2006 | Inouye |
| 2007/0000997 A1 | 1/2007 | Lambert et al. |
| 2007/0011089 A1 | 1/2007 | DeSchryver |
| 2007/0038515 A1 | 2/2007 | Postrel |
| 2007/0038924 A1 | 2/2007 | Beyer et al. |
| 2007/0045401 A1 | 3/2007 | Sturm |
| 2007/0061206 A1 | 3/2007 | LeFebvre |
| 2007/0083462 A1 | 4/2007 | Cubillo et al. |
| 2007/0087819 A1 | 4/2007 | Van Luchene et al. |
| 2007/0090183 A1 | 4/2007 | Hursta et al. |
| 2007/0100745 A1 | 5/2007 | Keiser |
| 2007/0100746 A1 | 5/2007 | Blair et al. |
| 2007/0100748 A1 | 5/2007 | Dheer et al. |
| 2007/0106603 A1 | 5/2007 | Whyte et al. |
| 2007/0136194 A1 | 6/2007 | Sloan |
| 2007/0152038 A1 | 7/2007 | Ciancio et al. |
| 2007/0168265 A1 | 7/2007 | Rosenberger |
| 2007/0174189 A1 | 7/2007 | Bishop et al. |
| 2007/0175982 A1 | 8/2007 | Bonalle et al. |
| 2007/0175984 A1 | 8/2007 | Khandaker et al. |
| 2007/0198352 A1 | 8/2007 | Kannegiesser |
| 2007/0198354 A1 | 8/2007 | Senghore et al. |
| 2007/0198403 A1 | 8/2007 | Aloni et al. |
| 2007/0233596 A1 | 10/2007 | Ambrose |
| 2007/0244778 A1 | 10/2007 | Bailard |
| 2007/0250380 A1 | 10/2007 | Mankoff |
| 2007/0260536 A1 | 11/2007 | Stone |
| 2007/0262140 A1 | 11/2007 | Long, Sr. |

(56) References Cited

U.S. PATENT DOCUMENTS

| | | |
|---|---|---|
| 2007/0265957 A1 | 11/2007 | Advani et al. |
| 2007/0265960 A1 | 11/2007 | Advani et al. |
| 2007/0267479 A1 | 11/2007 | Nix et al. |
| 2007/0271178 A1 | 11/2007 | Davis et al. |
| 2007/0276736 A1 | 11/2007 | Guilfoyle |
| 2007/0282740 A1 | 12/2007 | Wendt |
| 2008/0005001 A1 | 1/2008 | Davis et al. |
| 2008/0021772 A1 | 1/2008 | Aloni et al. |
| 2008/0040261 A1 | 2/2008 | Nix et al. |
| 2008/0040265 A1 | 2/2008 | Rackley, III et al. |
| 2008/0052189 A1 | 2/2008 | Walker et al. |
| 2008/0052224 A1 | 2/2008 | Parker |
| 2008/0059363 A1 | 3/2008 | Hotz et al. |
| 2008/0065532 A1 | 3/2008 | De La Motte |
| 2008/0091519 A1 | 4/2008 | Foss |
| 2008/0103968 A1 | 5/2008 | Bies et al. |
| 2008/0103970 A1 | 5/2008 | Books et al. |
| 2008/0120129 A1 | 5/2008 | Seubert et al. |
| 2008/0140561 A1 | 6/2008 | Neel |
| 2008/0140568 A1 | 6/2008 | Henry |
| 2008/0140576 A1 | 6/2008 | Lewis et al. |
| 2008/0162271 A1 | 7/2008 | Benjamin |
| 2008/0162337 A1 | 7/2008 | Greenland et al. |
| 2008/0210753 A1 | 9/2008 | Plozay et al. |
| 2008/0228643 A1 | 9/2008 | Hall |
| 2008/0235095 A1 | 9/2008 | Oles et al. |
| 2008/0270298 A1 | 10/2008 | McElroy et al. |
| 2008/0281734 A1 | 11/2008 | Longe et al. |
| 2008/0294977 A1 | 11/2008 | Friedman et al. |
| 2008/0301162 A1 | 12/2008 | Wall et al. |
| 2009/0006203 A1 | 1/2009 | Fordyce, III et al. |
| 2009/0048963 A1 | 2/2009 | Bishop et al. |
| 2009/0061929 A1 | 3/2009 | Evans |
| 2009/0063297 A1 | 3/2009 | Dooley et al. |
| 2009/0063342 A1 | 3/2009 | Beckers |
| 2009/0063351 A1 | 3/2009 | Schmeyer et al. |
| 2009/0078757 A1 | 3/2009 | Hanson et al. |
| 2009/0094125 A1 | 4/2009 | Killian et al. |
| 2009/0157220 A1 | 6/2009 | Walker et al. |
| 2009/0164351 A1 | 6/2009 | Sorbe et al. |
| 2009/0164362 A1 | 6/2009 | Moore |
| 2009/0164363 A1 | 6/2009 | Ahlers et al. |
| 2009/0171775 A1 | 7/2009 | Cashion et al. |
| 2009/0192934 A1 | 7/2009 | Chu et al. |
| 2009/0222367 A1 | 9/2009 | Jenkins et al. |
| 2009/0228307 A1 | 9/2009 | Sorbe |
| 2009/0254431 A1 | 10/2009 | Crowe et al. |
| 2009/0265241 A1 | 10/2009 | Bishop et al. |
| 2010/0030687 A1 | 2/2010 | Panthaki et al. |
| 2010/0057554 A1 | 3/2010 | Lanford |
| 2010/0057609 A1 | 3/2010 | Sibson |
| 2010/0076836 A1 | 3/2010 | Giordano et al. |
| 2010/0076875 A1 | 3/2010 | Ernst et al. |
| 2010/0106555 A1 | 4/2010 | Mneimneh et al. |
| 2010/0222132 A1 | 9/2010 | Sanford et al. |
| 2010/0280949 A1 | 11/2010 | Van Rensburg |
| 2010/0306104 A1 | 12/2010 | Johnson |
| 2010/0312684 A1 | 12/2010 | Kemper et al. |
| 2011/0047039 A1 | 2/2011 | Crames et al. |
| 2011/0093323 A1 | 4/2011 | Prus et al. |
| 2011/0106698 A1 | 5/2011 | Isaacson et al. |
| 2011/0112957 A1 | 5/2011 | Ingram et al. |
| 2011/0270664 A1 | 11/2011 | Jones |
| 2012/0271697 A1 | 10/2012 | Gilman et al. |
| 2013/0124429 A1 | 5/2013 | Zou et al. |
| 2013/0173407 A1 | 7/2013 | Killian et al. |
| 2014/0032381 A1 | 1/2014 | Killian et al. |

FOREIGN PATENT DOCUMENTS

| | | |
|---|---|---|
| EP | 0348932 A2 | 5/1995 |
| JP | 02-238593 A | 9/1990 |
| JP | 02-278495 A | 11/1990 |
| JP | 03-100791 A | 4/1991 |
| JP | 04-165588 A | 6/1992 |
| KR | 20100010217 A | 2/2010 |
| WO | 86/02757 A1 | 5/1986 |
| WO | 86/07647 A1 | 12/1986 |
| WO | 88/03297 A1 | 5/1988 |
| WO | 89/08899 A1 | 9/1989 |
| WO | 91/09370 A1 | 6/1991 |
| WO | 93/09515 A1 | 5/1993 |
| WO | 94/10649 A1 | 5/1994 |
| WO | 94/28498 A1 | 12/1994 |
| WO | 95/03570 A2 | 2/1995 |
| WO | 97/46986 A1 | 12/1997 |
| WO | 0060487 A1 | 10/2000 |
| WO | 2007133315 A2 | 11/2007 |
| WO | 2008102329 A2 | 8/2008 |
| ZA | 200709282 | 10/2007 |

OTHER PUBLICATIONS

Health Savings Account (HSA): Horizon Blue Cross Blue Shield of New Jersey, Small Employer Guide, Jan. 2006, 18 pages.

Kent FOC Newsletter, retrieved at www.accesskent.com/Courts/FOC/pdfs/newsletter/022006.pdf, Feb. 2006, 1 page.

Office Action for co-pending U.S. Appl. No. 12/397,113 dated Nov. 3, 2014.

Office Action for co-pending U.S. Appl. No. 12/626,349 dated Dec. 12, 2014.

Office Action for co-pending U.S. Appl. No. 12/731,852 dated Nov. 10, 2014.

Office Action for co-pending U.S. Appl. No. 12/892,847 dated Nov. 5, 2014.

Office Action for co-pending U.S. Appl. No. 13/287,725 dated Sep. 26, 2013.

Office Action for co-pending U.S. Appl. No. 13/450,617 dated Oct. 28, 2014.

Office Action for co-pending U.S. Appl. No. 13/782,550 dated Dec. 17, 2014.

Office Action for co-pending U.S. Appl. No. 14/071,386 dated Dec. 16, 2014.

Caskey et al., Is the Debit Card Revolution Finally Here?, Federal Reserve Bank of Kansas City, Economic Review; Fourth Quarter 1994; vol. 79 #4; pp. 79-95.

Castaneda, Laura, Business Promote Services to Customers Day In and Day Out, The Dallas Morning News, Nov. 26, 1994 (3 pages).

Coady et al., Targeted anti-poverty intervention: A selected annotated bibliography, World Bank, Apr. 2002.

Downes, How to avoid exchange charges Wasting Money A foreign currency bank account could be the answer, The Daily Telegraph, London (UK), Mar. 10, 2007.

Mangu-Ward, Payday of Reckoning, Reason, 41(5), Oct. 2009, pp. 40-47, retrieved Jun. 15, 2012, from Research Library (Document ID:1861658171).

99Bill Launches Installment Credit Services, PR Newswire, Aug. 21, 2008, 2 pages, retrieved Jul. 9, 2012, from Business Dateline (Document ID: 1536854041).

Avoid Gift Card Pitfalls, ConsumerReports.org.

Bank Deals—Best Rates and Deals: EverBank's World Currency CDs—My Interview with EverBank's Executive Frank Trotter, http://bankdeals.blogspot.com, Jul. 29, 2007.

Bank of Boulder POS Debit Solution at the Table Now in Beta: First Bank to Certify IVI Spirit C2000 on MAPP (R), Business Wire, Aug. 3, 1994 (1 page).

Barnes, David B., VeriFone Introduces Everest (TM) Customer Activated Payment System to Multi-lane Retail Market, PR Newswire, Feb. 20, 1995 (2 pages).

Blair et al., Challenges to the Dual Banking System: The Funding of Bank Supervision, FDIC Bank Review, Mar. 31, 2006.

Brown, Suzanne, Goodnight Amy, Meg, Beth and Jo, Rocky Mountain News, Dec. 8, 1994 (1 page).

Business Dateline, Q Comm Expands Calling Card Products with Best Telecom Point-of-Sale Activated Cards; All Q Comm VeriFone Merchants Can Now Deliver Durable Calling Cards (Dec. 6, 2010), Business Wire (Dec. 8, 2011).

(56) References Cited

OTHER PUBLICATIONS

Check Cashers Move Into Cards, Accounts (Cover Story), ATM & Debit News [serial online], Apr. 20, 2006, 6(24), pp. 1-3, available from Business Source Complete, Ipswich, MA.
Cohen, Bruce, Alternative to Cash Gains Ground, The Financial Post, Apr. 22, 1994 (2 pages).
Coleman, Richard W., Is the Future of the Microfinance Movement to be Found on the Internet?, International Trade and Finance Association Working Papers 2007.
Congressional Budget Office, "Emerging Electronic Methods for Making Payments" (Jun. 1996), CBO.
Credit Terminals to be Used at Canadian Liquor Outlets, Card News, Jan. 23, 1995 (1 page).
Cross, Sam Y., All About . . . the Foreign Exchange Market in the United States, Federal Reserve Bank of New York, 1998.
Debit Card Popularity on the Rise, Chain Store Age Executive, Jan. 1994 (1 page).
Debit Goes to Dinner, Credit Card Management, New York, Oct. 1994 (2 pages).
Developing Asia the World, Asian Development Bank, 2002.
Everest Reference Manual, VeriFone Part No. 25399, Revision A, Manual Revision 1.0, Jul. 1995 (66 pages).
Express Cards and Trains, Chain Store Executive Edition, Jan. 1995 (1 page).
Final Office Action for co-pending U.S. Appl. No. 13/338,584 dated Sep. 15, 2011.
Final Office Action for co-pending U.S. Appl. No. 12/338,684 dated Sep. 23, 2011.
Final Office Action for co-pending U.S. Appl. No. 12/367,187 dated Feb. 12, 2014.
Final Office Action for co-pending U.S. Appl. No. 12/389,749 dated Mar. 29, 2012.
Final Office Action for co-pending U.S. Appl. No. 12/731,852 dated Apr. 5, 2012.
Final Office Action for co-pending U.S. Appl. No. 12/877,524 dated Jun. 8, 2012.
Final Office Action for co-pending U.S. Appl. No. 12/889,281 dated Apr. 8, 2013.
Final Office Action for co-pending U.S. Appl. No. 12/892,847 dated Mar. 29, 2013.
Final Office Action for co-pending U.S. Appl. No. 13/036,076 dated Apr. 8, 2013.
Final Office Action for co-pending U.S. Appl. No. 13/214,126 dated Aug. 1, 2013.
Final Office Action for co-pending U.S. Appl. No. 13/232,700 dated Oct. 12, 2012.
Final Office Action for co-pending U.S. Appl. No. 13/349,290 dated Mar. 14, 2013.
Financial Advice Investment Money, HSBC Offshore Internet Banking, Oct. 1, 2009 at 5:50pm.
Financial Advice Investment Money, HSBC Offshore Internet Banking, Oct. 1, 2009 at 7:25am.
Flannery, Matt, Kiva and the Birth of Person to Person Microfinance, Innovations, Winter & Spring 2007, pp. 31-56.
Foreign Exchange Market, http://en.wikipedia.org.
Fox, Linda A., Keep an Eye on Your Credit Card, The Toronto Sun, Aug. 9, 1996 (1 page).
Garriss, J., (2004), Forging an ideal HSA, Workspan, 47(5), 18-25, Retrieved Sep. 3, 2013.
Heng et al., Implications of Web 2.0 for financial institutions: Be a driver, not a passenger, Munich Personal RePEc Archive, Jul. 31, 2007.
Hulme et al., Internet Based Social Lending: Past, Present and Future, Social Futures Observatory, Oct. 2006.
Hypercom S7C Advertisement, Chain Store Age, Sep. 1995 (4 pages).
Hypercom S7SC Advertisement, Chain Store Age, Feb. 1996 (2 pages).
IBM 4680 General Sales Application Electronic Funds Transfer User's Guide, IBM Corp., Research Triangle Park, NC, Dec. 1990 (260 pages).
IBM 4680 General Sales Application Electronic Funds Transfer User's Guide, IBM Corp., Research Triangle Park, NC, Mar. 1991 (263 pages).
IBM 4680 General Sales Application: Guide to Operations, Research Triangle Park, NC, Jun. 1991 (422 pages).
IBM 4680-4690 Advanced Payment System for Chain Drug Sales Application User's Guide, Jul. 1996 (248 pages).
Office Action for co-pending U.S. Appl. No. 13/450,617 dated May 12, 2014.
Final Office Action for co-pending U.S. Appl. No. 12/892,847 dated Aug. 12, 2014.
Hod et al. "Did the Shopping Coupon Program Stimulate Consumption? Evidence from Japanese Micro Data" ESRI Discussion Paper Series No. 12, Apr. 2002, 45 pages.
Office Action for co-pending U.S. Appl. No. 12/367,187 dated Sep. 24, 2014.
Office Action for co-pending U.S. Appl. No. 12/389,749 dated Oct. 3, 2014.
Office Action for co-pending U.S. Appl. No. 13/287,725 dated Aug. 25, 2014.
Office Action for co-pending U.S. Appl. No. 13/349,290 dated Oct. 22, 2014.
Office Action for co-pending U.S. Appl. No. 13/782,550 dated Sep. 12, 2014.
Office Action for co-pending U.S. Appl. No. 13/863,578 dated Sep. 30, 2014.
IBM 4680-4690 Advanced Payment System for Chain Drug Sales Application User's Guide, Nov. 1996 (256 pages).
IBM 4680-4690 Advanced Payment System for Supermarket Application User's Guide, Sep. 1996 (222 pages).
IBM 4680-4690 Supermarket Application—Electronic Funds Transfer Feature Enhancement: User's Guide, IBM Corp., Research Triangle Park, NC, Sep. 1995 (318 pages).
International Search Report, PCT/US08/87689, dated Jun. 17, 2009.
International Search Report, PCT/US09/34692, dated Apr. 14, 2009.
International Search Report, PCT/US09/39492 dated May 14, 2009.
International Search Report, PCT/US09/39495, dated May 18, 2009.
International Search Report, PCT/US09/39504, dated May 27, 2009.
International Search Report, PCT/US09/39512, dated Jun. 8, 2009.
International Search Report, PCT/US09/43978, dated Jun. 30, 2009.
International Search Report, PCT/US09/43988 dated Jul. 14, 2009.
International Search Report, PCT/US09/56072, dated Oct. 20, 2009.
Intralinks, Inc. Begins European Rollout of Its Proven Electronic Solution for Loan Syndication, London (Business Wire), Oct. 8, 1997, 4 pages.
Jane Boon Pearlstine, Lenders, Borrowers Hook Up Over the Web: Prosper.com and Other Sites Provide Forum for Individual Bidders Willing to Offer Small Loans, Wall Street Journal, May 20, 2006.
Jones, Tim, Paradigms lost, RSA Journal, Oct. 2006, pp. 28-31.
Klein, Robert J., Here Comes the Debit Card, D&B Reports, Jul./Aug. 1990 (2 pages).
Krino et al., A Birthday Card That Pays Off, The Orange County Register, Jul. 19, 1996 (2 pages).
Lazarus, David, 120% rate for Wells' Advances, Oct. 16, 2004, San Francisco Chronicle.
Letter of Credit Explained: What is Letter of Credit?, Dec. 26, 2005, 2 pages.
Mannix, Margaret, Checkout Tech, U.S. News and World Report, Feb. 27, 1995 (3 pages).
MasterCard Electronic prepaid (Oct. 2003). The Nilson Report, (798), (Dec. 9, 2011), The Banking Source (Document ID 474833171).
MicroTrax Electronic Payment Systems: The MicroTrax Pinstripe Lane Equipment Users Guide, MicroTrax Ltd., Newport Beach, CA, 1991 (54 pages).
MicroTrax Ltd. Omni 490M (and 490ML) Operation Manual for Integrated and Non-Integrated Configurations, 1994 (60 pages).

(56) References Cited

OTHER PUBLICATIONS

MicroTrax Ltd., PC Electronic Payment Systems Reference Manual; 1995 (381 pages).
NCR 4430-5000 MSR/PIN User's Guide, 1994 (265 pages).
Neiman Marcus Express Card Advertisement, The New Yorker, Dec. 12, 1994 (3 pages).
Neiman Marcus to Launch NM Express Automated Gift Card, PR Newswire, Nov. 22, 1994 (2 pages).
Nieman Marcus Offers Electronic Gift Certificate, Card Fax, Jan. 23, 1995 (1 page).
Nieman Marcus: High-Tech for the Holidays, ADWEEK, Dec. 5, 1994 (1 page).
Notice of Allowance for co-pending U.S. Appl. No. No. 12/417,162 dated Oct. 1, 2012.
Office Action for co-pending U.S. Appl. No. 12/367,187 dated Aug. 1, 2013.
Office Action for co-pending U.S. Appl. No. 12/397,113 dated Oct. 15, 2013.
Office Action for co-pending U.S. Appl. No. 12/626,349 dated Nov. 27, 2013.
Office Action for co-pending U.S. Appl. No. 13/287,725 dated Jan. 17, 2014.
O'Keefe, Michael, Portable POS Debit Terminal Mean Greater Convenience, Bank Systems & Technology, Nov. 1994 (2 pages).
Omni 480/490 Programmer's Guide, VeriFone Part No. 12924—Revision A, Manual Revision 1.0, Oct. 1993 (228 pages).
One Company's Diversification Shakes Up Peripherals Market, Chain Store Age, Jun. 1996 (3 pages).
Orszag, Peter, Unemployment Insurance as an Economic Stimulus, Center for Budget and Policy Priorities, Nov. 15, 2011.
Parrott, James, Jittery Wall Street, Calm City?, Gotham Gazette, Apr. 16, 2007.
Peppard, Alan, Down and Dirty in Deep Ellum, The Dallas Morning News, Dec. 3, 1994 (2 pages).
POS Terminal Can Handle Direct Debits, ABA Banking Journal, Sep. 1984 (2 pages).
Powell, Robert L., Statewide Electronic Commerce Program Status Report, State of North Carolina Office of the State Controller, Mar. 7, 2007.
Prosper, Access and Transparency through Person-to-Person Lending, FDIC Advisory Committee on Economic Inclusion, Mar. 28, 2007.
Pyatt, Rudolph A., Jr., Mobil Stations to Permit Use of Bank Cards, The Washington Post (1 page).
Racal Corp. Advertisement, POS Terminal Eliminates Credit Card Vouchers, ABA Banking Journal, Nov. 1985 (2 pages).
Rumiany, Diego, Internet Bidding for Microcredit: making it work in the developed world, conceiving it for the developing world, Mar. 2007.
Scott et al., The web we weave, Financial World, Nov. 2006, pp. 12-15.
Service Mark Registration No. 1,981,044 for "NM Express Card" registered Jun. 18, 1996 (1 page).
Szabo, Joan C., The Changing World of Financial Services, Nation's Business, Oct. 1994 (7 pages).
United Nations Conference on Trade and Development, E-finance and Small and Medium-Size Enterprises (SMEs) in Developing and Transition Economies, UNCTAD Expert Meeting, Oct. 17, 2001.
VeriFone Everest Advertisement, Stores, May 1995 (2 pages).
VeriFone Folio (TM) Brings Credit and Debit Card Payment to the Restaurant Table, PR Newswire, May 16, 1994 (3 pages).
VeriFone Introduces Pinpad (TM) 1000 to Point-of-Sale Debit Market, M2 Presswire, Apr. 21, 1995 (1 page).
VeriFone TCL Terminal Control Language Programmer's Manual, VeriFone Part No. 00368-01, Revision G, Manual Revision 8.0, Aug. 1992 (362 pages).
VeriFone Tranz 330 Reference Manual, Verifone Part No. 00483-Revision D, Manual Revision 3.01, Apr. 1990 (144 pages).
VIPGift Receives Investment From Summit Partners and Bridgescale Partners, Chattanooga, TN and Palo Alto, CA, Nov. 1, 2008.
Wolf, Alan Steven, What to do when the Chain Breaks, Servicing Management, Feb. 1997, 3 pages.
Wolf, File History of US 2005/0278347.
Wolfe, Daniel, An E-Variation on Payday Loan Theme, American Banker, Jul. 28, 2005.
Zandi, Mark, Washington Throws the Economy a Rope, Moody's Economy.com, Jan. 22, 2008.
Zubko, N., An Automatic Connection Electronic Transaction Tools Help Manufacturers Connect With Suppliers to Streamline Sourcing Efforts, Industry Week, vol. 257, No. 7, Jul. 2008, pp. 26-27.
Office Action for co-pending U.S. Appl. No. 13/036,076 dated Jan. 29, 2015.
Office Action for co-pending U.S. Appl. No. 13/232,700 dated Jan. 29, 2015.

\* cited by examiner

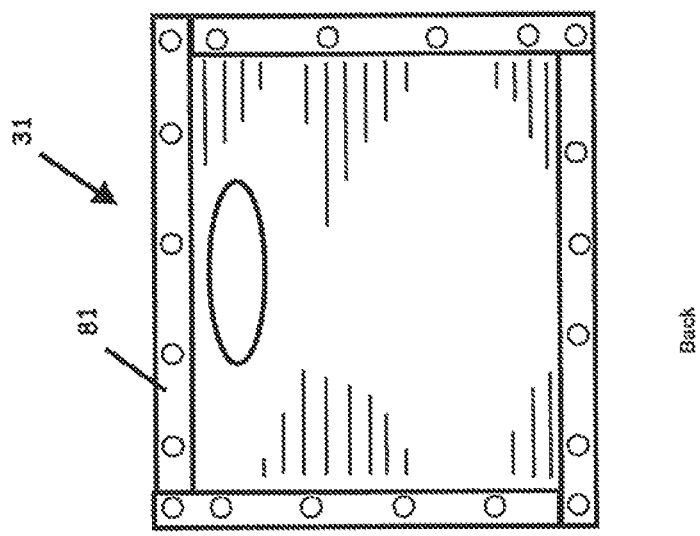
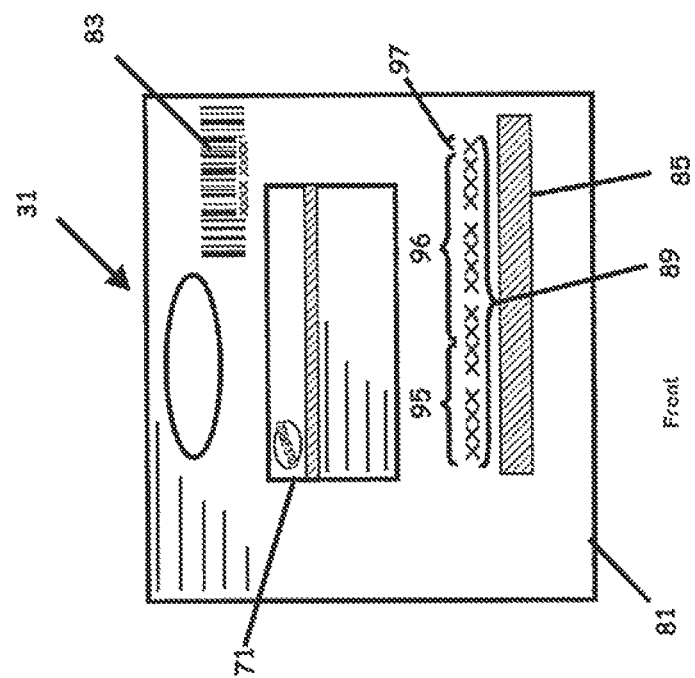

SYSTEM, PROGRAM PRODUCT AND METHODS FOR RETAIL ACTIVATION AND RELOAD ASSOCIATED WITH PARTIAL AUTHORIZATION TRANSACTIONS

RELATED APPLICATIONS

This application claims priority to and the benefit of U.S. patent application Ser. No. 12/554,432, filed Sep. 4, 2009, titled "System, Program Product And Methods For Retail Activation And Reload Associated With Partial Authorization Transactions," which claims priority to U.S. Provisional Patent Application No. 61/148,752, filed on Jan. 30, 2009, titled "System, Program Product and Methods for Retail Activation and Reload Associated With Partial Authorization Transactions," U.S. Provisional Patent Application No. 61/110,332, filed Oct. 31, 2008, titled "System, Program Product and Methods for Retail Activation and Reload Associated With Partial Authorization Transactions," U.S. Provisional Patent Application No. 61/094,335, filed Sep. 4, 2008, titled "System, Program Product and Methods for Retail Activation and Reload Associated With Partial Authorization Transactions," and U.S. Provisional Patent Application No. 61/118,127, filed on Nov. 26, 2008, titled "System, Apparatus, Methods and Program Product for Electronic Inventory Tracking," and is related to U.S. Provisional Patent Application No. 61/110,319, filed on Oct. 31, 2008, titled "System, Methods, and Program Product for Electronic Order Entry," each incorporated by reference in its entirety.

BACKGROUND OF THE INVENTION

1. Field of the Invention

The present invention relates generally to the financial service and card product industries, and more specifically, to systems, program products, and associated methods of activating financial and non-financial transaction cards and reloading debit-type and other prepaid payment Or other cards using partial authorization messaging.

2. Description of Related Art

It has been known that banks offer and sell bank card products such as debit cards, credit cards, automatic teller machine (ATM) cards, gift cards, and combinations thereof, e.g., ATM/debit card, which provide an alternative payment methodology to that of using cash (hard-currency) or paper checks when making purchases. Such cards typically have advantages that can not be provided by the use of cash. For example, if cash is stolen, even if the thief is caught, it is almost impossible to prove ownership of the cash. Further, the issuers of the cards typically have procedures to absolve or limit liability of the consumer if the theft is reported within a preset time frame. Such cards also can have or provide built in procedures that help prevent usage by less educated thieves. Further, because of the convenience and flexibility, such cards have become a valuable tool used by retailers to provide consumers with rebates, in-store credit, and promotions.

From the aspect of the consumer, use of such cards, particularly debit cards, e.g., pre-paid debit cards, branded gift cards, etc., are functionally similar to writing a check, as the funds are withdrawn directly from either the bank account, or in some cases, from the remaining balance on the card. Although credit cards have been popular for many years, the use of debit-type cards has only more recently become wide-spread, and is still growing. Such use, in fact, in many countries, has quickly moved to a point of becoming more popular than the "paper" check, and at least by volume, in certain instances, has even exceeded the use of cash.

From the aspect of the merchant, there has traditionally been a substantial difference in the methodology of handling debit cards from that of handling credit cards. For example, credit card purchases have traditionally been processed through use of a merchant account affiliated with a credit card payment network such as, for example, Visa®, MasterCard®, American Express®, Discover®, etc., whereas debit card purchases have traditionally been processed through an interbank network such as, for example, Cirrus®, PLUS®, etc.

Debit cards supplied directly by a bank that provide access to funds of a specific user bank savings or checking account have traditionally been mailed directly to the user's address provided by the user for the bank to send monthly bank statements and are activated using a 1-800 number. Other types of the cards, for example, gift and other prepaid cards, however, are generally delivered directly by the merchant. Activation of such prepaid cards has typically been through use of proprietary activation terminals unique to the card issuer's distributor. This type of system is typically referred to as a "closed system." In one exemplary closed system, at the time of sale, the retail merchant enters a card identifier and a value into a dedicated activation terminal. The activation terminal connects to the computer system of the card issuer's distributor and sends the entered value to request activation of the identified card. Although somewhat functional, such closed systems can be expensive to implement, both monetarily and space wise, due to the requirement for having the dedicated terminal. Further, such systems can limit a merchant's ability to easily switch between different card issuers, as one card issuer's distributor's activation terminal would not be expected to be compatible with a different card issuer's distributor's system.

Some newer types of card systems utilize the multi-application capability of the merchant's standard POS terminals provided by "open systems" payment vendors to permit a "closed system" application to reside in the "open systems" payment terminal. Such systems can allow access to the card issuer via, the traditional debit network, through a sponsor bank, or via a direct connection, etc. Such systems, however, can be expensive to implement and can have a significant impact on the point-of-sale system. For example, such systems require substantial software upgrades to the merchant's point-of-sale ("POS") system. Such upgrades typically have a substantial lag (e.g., six months or more) between the time a merchant requests such upgrades and the time such upgrades are tested and delivered. Accordingly, such systems can also limit a merchant's ability to easily switch between different card issuers, as one card issuer's software upgrades would not be expected to be compatible with a different card issuer's system. Further, such systems can slow down the checkout line as they may require an interruption in the normal register operations once a merchant begins to process the sale of the prepaid card. Recognized by the inventors, however, is that "open systems" nevertheless have the potential for providing the merchant needed flexibility.

These tradition closed and hybrid card systems also characteristically implement the settlement of activation funds as a funding transaction between the merchant and the issuer's distributor and then between the issuer's distributor and the issuer. Such methodology adds a significant delay and risk in protecting and facilitating the accessibility of the customer's money.

Accordingly, recognized by the inventors is the need for a system, apparatus, program product, and methods which can allow activation of gift and other prepaid cards via the merchant's POS system that does not require significant software upgrades, that can use existing POS system communication networks, and that does not require interruption in normal register operations, and that can settle activation funding directly between merchant and issuer in a timely manner.

SUMMARY OF THE INVENTION

In view of the foregoing, various embodiments of the present invention advantageously provide a system, apparatus, program product, and methods that can allow activation of gift and other prepaid cards via the merchant's point-of-sale ("POS") system without the need to perform a significant software upgrade to the merchant's POS equipment. Such embodiments of the present invention advantageously can use existing POS equipment communication networks to communicate between the POS equipment and the card issuer/affiliated financial institution. Embodiments of the present invention also advantageously do not require interruption of normal register operations when processing a purchase of a prepaid or gift card along with other retail items.

More particularly, various embodiments of the present invention advantageously provide systems for activating and processing the sale of a serialized transaction card product over existing payment networks utilizing partial-authorization messaging. An example of a system according to an embodiment of the present invention, for example, includes a financial institution server positioned at a financial institution site, remote from, and in communication with, a merchant point-of-sale ("POS") apparatus through an open payment network, and transaction card account activation and processing computer program product stored in the memory of the financial institution server to manage transaction card activation. The financial institution server is typically owned or associated with a transaction card issuer.

The transaction card account activation and processing computer program product can include a set of instructions that, when executed by a computer such as, for example, the financial institution server, cause the computer to perform various operations to include receiving a first payment message including transaction card account activation request data from the merchant point-of-sale apparatus through the existing open payment network responsive to a user interfacing a transaction card product account activation indicator with the merchant point-of-sate apparatus, and sending activation approval data to the merchant POS apparatus through the payment network (e.g., data indicating a partial authorization approval balance of zero dollars) responsive to receiving at least portions of the activation request data. The account activation indicator is positioned on a portion of an external surface of a retail container of a transaction card product securely containing a transaction card, which carries a first storage medium containing indicia of a first unique transaction card identifier associated with a unique transaction card transaction account. The account activation indicator includes a second storage medium containing indicia of a second unique transaction card identifier associated with the first unique transaction card identifier, and the activation request data includes at least a portion of the second unique transaction card identifier and a flag indicating a capability of the merchant POS apparatus to support partial-authorization messaging.

The operations can also include receiving from the merchant POS apparatus through the payment network, a second payment message including transaction card product purchase acknowledgment data (e.g., a purchase acknowledgment indicating that the merchant POS apparatus and/or a merchant associated therewith received sufficient monetary funds from a purchasing customer to purchase the transaction card product), and a completing activation of the transaction card responsive to receiving at least portions of the purchasing knowledge data. This can include translating a portion of the second unique transaction card identifier (e.g., "Activation BIN") to at least a portion of the first unique transaction card identifier (e.g., "Transaction Bin" or "Actual Transaction Card ID"), and funding the associated transaction card transaction account, for example, according to the transaction card value advertised on the retail packaging.

The transaction card product, according to the exemplary embodiment of the system, provides a transaction card including a first magnetic strip storing the first unique transaction card identifier associated with or otherwise linked to a unique transaction card transaction account, and a tamper evident retail packaging container securely containing the transaction card. The packaging container carries a product identification indicator positioned on a first portion of an external surface, and the account activation indicator positioned on a second portion of the external surface. The account activation indicator can include a second magnetic strip storing the assigned second unique transaction card identifier, which is different from, but linked to, the first transaction card identifier, so that a prospective thief having knowledge of the second unique transaction card identifier would not readily have knowledge of the first transaction card identifier or the associated unique transaction card transaction account. The second unique transaction card identifier is beneficially associated with the first transaction card identifier so that the financial institution server can activate the unique transaction card transaction account responsive to receiving an indication of at least portions of the second transaction card identifier without having first received at least portions of the first transaction card identifier.

Various embodiments of the present invention also provide transaction card account activation and processing computer program product as a standalone product stored in a computer readable medium, to manage transaction card activation. An example of such program product, according to an embodiment of the present invention, can include a set of instructions that, when accessed and executed by a computer (e.g., financial institution server or servers, or other computer or computers, etc.), cause the computer or computers to perform various operations including the operation of receiving a first payment message including transaction card account activation request data from a merchant point-of-sale apparatus through an existing, e.g., open payment network responsive to a user interfacing a transaction card product account activation indicator with the merchant point-of-sale apparatus. The activation request data can include at least a portion of the second unique transaction card identifier and a flag indicating a capability of the merchant POS apparatus to support partial-authorization messaging. The account activation indicator is typically carried on a retail packaging container of the transaction card product securely containing the transaction card. The account activation indicator includes a second storage medium storing the assigned second unique transaction card identifier. The second unique transaction card identifier is different from, but linked to, the first unique transaction card identifier. The activation request data includes at least a portion of the second unique transaction card identifier and a flag indicating a capability of the merchant POS apparatus to support partial-authorization messaging.

The operations can also include sending activation approval data to the merchant POS apparatus through the payment network responsive to receiving at least portions of the activation request data, and can include completing activation of the transaction card responsive to receiving the second payment message. The activation approval data can include data indicating a partial authorization approval balance of, e.g., zero dollars for the transaction card transaction account. The operations can further include receiving a second payment message including transaction card product purchase acknowledgment data from the merchant POS apparatus through the payment network. The purchasing acknowledgment data can include a purchase acknowledgment that the merchant POS apparatus or a merchant associated therewith has received sufficient monetary funds from a purchasing customer to purchase the transaction card product.

Various embodiments of the present invention also provide apparatus, e.g., in the form of a retail transaction card product, to facilitate retail activation and processing the sale of a transaction card utilizing partial-authorization messaging. An example of an apparatus, according to an embodiment of the present invention, can include or otherwise provide a financial or non-financial transaction card including a magnetic strip storing a first unique transaction card identifier associated with or otherwise linked to a unique transaction card transaction account, which can have an account number that is the same as the card identifier or a different series of numbers. The apparatus can also include a tamper evident retail container containing the transaction card and carrying or otherwise including a product identification indicator, e.g., UPC, and an account activation indicator, e.g., magnetic strip, storing or otherwise including indicia of an assigned second unique transaction card identifier different from that of the first transaction card identifier. The account activation indicator is positioned to allow a remotely positioned financial institution, through a merchant POS and a payment network, to identify the transaction card while the transaction card is securely contained within the container. The second unique transaction card identifier is either directly associated with the first unique transaction card identifier or indirectly associated therewith through an association with the unique transaction card transaction account which is directly associated with the first unique transaction card identifier, for example, to allow ready identification and activation of the transaction card without the need to open the retail package.

Various embodiments of the present invention also provide methods of activating and processing the sale of a serialized transaction card product over existing payment networks utilizing partial-authorization messaging. An example of a method, according to an embodiment of the present invention, can include various steps including associating each of a plurality of transaction cards, e.g., branded gift and prepaid debit cards (each associated with a separate first unique transaction card identifier) with a corresponding separate one of a plurality of unique transaction card transaction accounts. The method can also include the steps of generating a second unique transaction card identifier for each separate one of the plurality of transaction cards, linking or otherwise associating each second unique transaction card identifier to a separate corresponding first transaction card identifier, packaging each of the plurality of transaction cards in a separate retail container to form a plurality of retail transaction card products, and distributing the plurality of retail transaction card products to a merchant having point-of-sale ("POS") apparatus that supports partial-authorization messaging in a POS environment. Each retail container can include or have affixed thereto a product identification indicator (e.g., UPC) and an activation account indicator (e.g., magnetic strip) storing or otherwise including indicia of an assigned one of the plurality of second unique transaction card identifiers.

The method can also include the steps of receiving a first payment message including activation request data from the merchant POS apparatus of an existing, e.g., open payment network by a suitably configured computer such as, for example, the financial institution server described above, responsive to a user interfacing an account activation indicator of a selected one of the transaction card products with the merchant POS apparatus, and sending activation approval data to the merchant POS apparatus through the payment network responsive to receiving at least portions of the activation request data. The activation request data is associated with a selected one of the retail transaction card products to be purchased containing one of the plurality of transaction cards and can include at least a portion of the second unique transaction card identifier assigned to the selected transaction card, and a flag indicating a capability of the merchant POS apparatus to support partial-authorization messaging. The activation approval data corresponding can include data indicating a partial authorization approval balance for the transaction card transaction account associated with the selected transaction card.

The method can also include the steps of receiving a second payment message by the computer containing transaction card product purchase acknowledgment data from the merchant POS apparatus through the payment network, and can include completing activation of the selected transaction card responsive to receiving at least portions of the purchase acknowledgment data. The purchase acknowledgment data can include a purchase acknowledgment (indication) indicating that the merchant POS apparatus or a merchant associated therewith received sufficient monetary funds from a purchasing customer to purchase the selected transaction card.

Further, having activated the card via partial-authorization messaging, the method can further include the issuer settling funds directly (merchant bank to issuing bank) to acquire the customer's value from the merchant to fund the card account. That is, responsive to the partial-authorization which placed the merchant in a position to apply a separate tender via a standard payment transaction to pay for the "value sold", the issuer advantageously can settle directly with the merchant, e.g., via ACH, for the pre-denominated amount of the transaction plus contract fees.

Various embodiments of the present invention also provide methods of forming apparatus to facilitate retail activation and processing the sale of a transaction card utilizing partial-authorization messaging. An example of such a method, according to an embodiment of the present invention, can include various computer-implemented steps including generating a plurality of first unique transaction card identifiers each to be assigned or otherwise associated with a separate one of a plurality of transaction cards, and generating a plurality of second unique transaction card identifiers each to be assigned or otherwise associated with a separate one of the plurality of transaction cards and each to be applied to a corresponding separate one of a plurality of e.g., tamper evident retail containers configured to contain a respective one of the plurality of transaction cards. The step of generating the plurality of first unique transaction card identifiers can include combining or otherwise associating each of a plurality of unique numbers with a first common Bank Identification Number ("BIN") defining a transaction BIN to thereby form the plurality of first unique transaction card identifiers. The step of generating a plurality of second unique transaction card identifiers can include combining or otherwise associating each of the plurality of unique numbers with a second common BIN defining an activation BIN to form a plurality of second unique transaction card identifiers.

The method can also include the steps of directly associating each second unique transaction card identifier of the plurality of second unique transaction card identifiers with a corresponding separate one of a plurality of first unique transaction card identifiers, for example, to use of a look-up table, or indirectly associating each separate one of the plurality of second unique transaction card identifiers with a corresponding separate one of the plurality of first unique transaction card identifiers via associating each respective second unique transaction card identifier with a corresponding separate one of the plurality of unique transaction card transaction accounts, which is, in turn, associated with the respective separate one of the plurality of first unique transaction card identifiers. This can be accomplished, for example, through use of a pair of lookup tables. Note, in a typical embodiment of the present invention, the first unique transaction card identifier and/or the second unique transaction card identifier each incorporate the associated transaction card transaction account number or a number associated therewith. Accordingly, identification of the transaction card transaction account number via either one of the first or second associated unique transaction card identifiers can be used to identify the other unique transaction card identifier.

The method can also include positioning each transaction card of the plurality of transaction cards within a separate one of the plurality of containers, and affixing to each of the plurality of containers, corresponding unique indicia (e.g., an open payment network processing system compatible magnetic strip, REID, etc.) indicating the respective second unique transaction card identifier directly or indirectly associated with the first unique transaction card identifier stored in the storage medium carried by the transaction card contained within the container, to thereby form the plurality of transaction card product apparatus for distribution and retail sale, for example, according to the methodologies described above using the systems described above.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIGS. 2A-2B are a perspective view of the front and back of a tamper evident transaction card product according to an embodiment of the present invention;

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout.

FIGS. 1-11 illustrate a system 30, program product, and methods for activating and processing the sale of a serialized transaction card product 31 over existing payment networks utilizing partial-authorization messaging. Such system 30, program product, and methods can allow activation of a transaction card via the merchant's point-of-sale ("POS") systems or apparatus 37 without the need to perform a significant software upgrade to the existing merchant's POS systems or apparatus 37. As such, the transaction card product 31 can be distributed to and sold by a merchant without a significant burden on either the merchant, the merchant's employees, the merchant's computer system, or the merchant's floor space, etc., for the merchant to be able to begin immediately selling the transaction card product 31.

Figure 1:
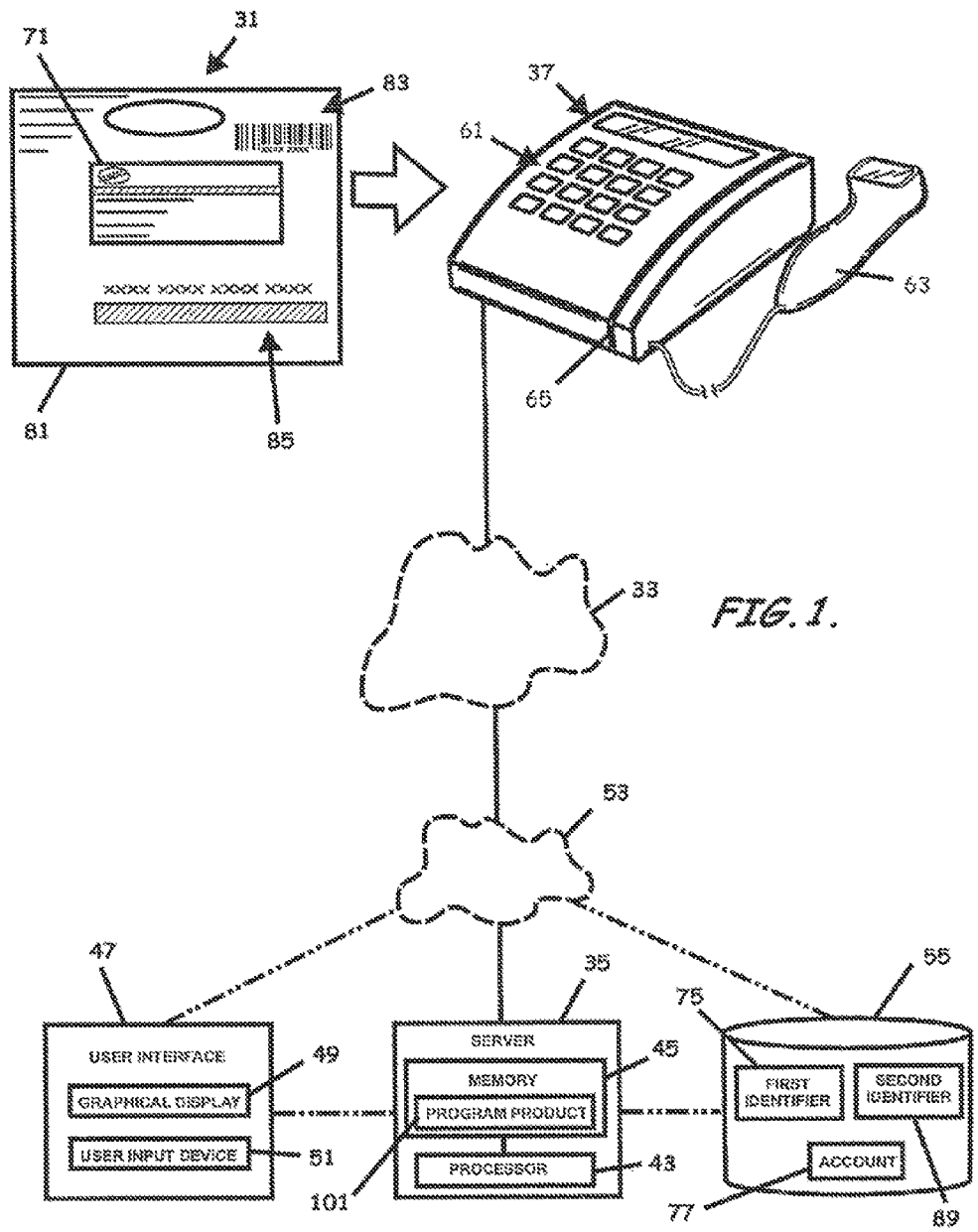
FIG. 1 is a schematic block diagram of a system for activating and processing the sale of a serialized transaction card product over existing payment networks utilizing partial-authorization messaging according to an embodiment of the present invention.
Figures 2C, 2D:
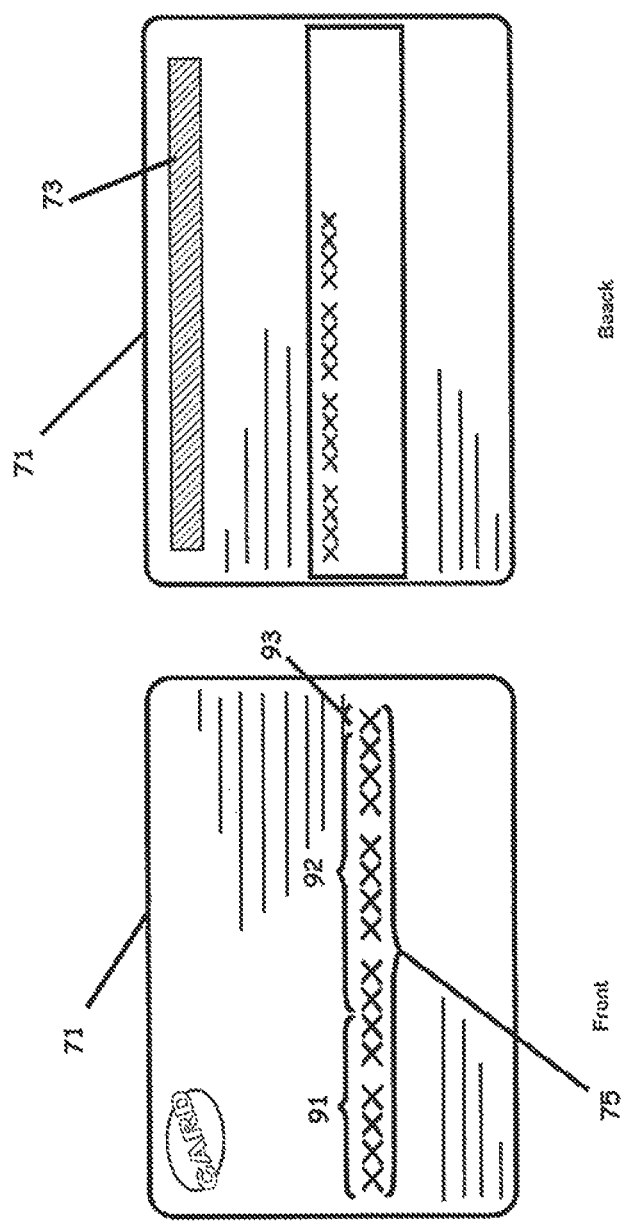
FIGS. 2C-2D are a perspective view of the front and back of a transaction card to be positioned in the tamper evident transaction card product according to an embodiment of the present invention.

As perhaps best shown in FIG. 1, and as identified above, various embodiments of the present invention provide a system 30 for activating and processing the sale of a serialized transaction card product 31 (see, e.g., FIGS. 2A-2B), e.g., packaged/wrapped gift, prepaid debit-type cards, secured credit cards, phone cards, etc., over an existing open payment network 33, e.g., Visa®, Master-Card®, American Express®, Discover®, etc., utilizing partial-authorization messaging.

Note, although not necessarily used in the manner for which it was developed, according to various embodiments of the present invention, partial-authorization messaging provides a useful tool for activating the serialized transaction card product 31. Partial-authorization messaging is a communication capability implemented, for example, by Visa®, which allows Visa® to return a purchase authorization value for a Visa® prepaid card to be the current account balance instead of the requested value when the requested value is over the associated account balance. For example, if a gasoline pump configured to accept partial authorizations, transmits a purchase authorization request of, for example, $50, in response to a payment from a Visa® prepaid card, but the account balance of the associated account is only $30, the Visa® debit processing system can return a partial authorization of $30. Accordingly, the pump can configure itself to automatically shut off if the meter reaches $30. If the pump was not configured to support partial authorizations, a Visa® would have returned a message indicating insufficient funds were available. Thus, the account balance would need to be verified by the user so that the pump could be set, for example, by the merchant, to be limited to the amount of fuel representing an amount equal to or less than the account balance.

As further shown in FIG. 1, the system 30, according to an embodiment of the present invention, can include the transaction card product 31 and a financial institution computer (e.g. financial institution server 35), positioned at a financial institution site and affiliated, for example, with an issuer of the transaction card product 31. The system 30 can also include a merchant POS apparatus 37 positioned remote from the financial institution server 35 and in communication with the financial institution server 35 through the payment network 33.

The financial institution server 35 can contain or otherwise include a processor 43, and memory 45 coupled to the processor 43 to store software and database records therein, for example, connected directly to system/non-system components and/or networked to such components. As such, the system 30 can further include a user interface 47, which can include a graphical display 49 for displaying graphical images, and a user input device 51 as known to those skilled in the art, to provide a user access to manipulate the software and database records, The user interface 47 can be either directly connected to the server 35, or through, e.g., a local area network 53, as known to those skilled in the art.

Note, the memory 45 can include volatile and nonvolatile memory known to those skilled in the art, including, for example, RAM, ROM, and magnetic or optical disks, just to name a few. Note also, it should also be understood that the preferred server configuration of server 35 is given by way of example and that other types of servers or computers configured according to various other methodologies known to those skilled in the art, can be used. The server 35 shown schematically, for example, in FIG. 1, represents a server or server cluster or server farm and is not limited to any individual physical server. The server 35 can be a personal computer capable of functioning as a server, a plurality of computers on a local area network, or a "traditional" server as known by those skilled in the art. The server site may be deployed as a server farm or server cluster managed by a serving hosting provider. The number of servers and their architecture and configuration may be increased based on usage, demand and capacity requirements for the system 30.

The merchant POS apparatus 37 can include a keypad 61 for entering in alphanumeric symbols, a barcode scanner 63, and a magnetic strip reader/slot 65. Alternative embodiments of the merchant POS apparatus 37 can include an RFID interface (not shown) and/or a contact memory button reader (not shown). The merchant POS apparatus 37 further includes various software and hardware for interfacing with the payment network 33 as known and understood by those skilled in the art.

The transaction card product 31 (see, e.g., FIGS. 2A-2B) can include a transaction card 71 (see, e.g., FIGS. 2C-2D) which can be either a financial or non-financial transaction card. The transaction card 71 can include a storage media, e.g., magnetic strip 73, storing a first unique transaction card identifier 75 associated with a unique transaction card transaction account/number 77 (terms used interchangeably throughout). The transaction card transaction account 77 can have an account number that is the same as the card identifier 75 or a different series of numbers as known to those skilled in the art. Note, it should be understood that although magnetic strip 73 provides the typical storage media configuration for most types of transaction card 71, other forms of storage including RFID, contact memory, etc., are within the scope of the present invention.

As shown in FIGS. 2A-2B, the transaction card product 31 can also include a retail package container 81 containing the transaction card 71. According to a preferred configuration, the packaging container 81 is in the form of a tamperproof and tamper evident packaging container 81 which not only masks and prevents access to the magnetic strip 73 of the transaction card 71, but also includes characteristics known to those skilled in the art, which result in the packaging container 81 having various tamper evident features such that the container 81 readily visually indicates to the merchant, any attempts by a customer or thief to remove the card 71 or gain physical access to the transaction card 71. Note, where the storage media storing the first unique transaction card identifier 75 is in the form of MD chip, the packaging container 81 can further include appropriate radiofrequency shielding as known to those skilled in the art.

In an exemplary scenario, a thief, whom can be a number of types of individuals ranging from merchant employees to third-party customers, removes one or more packaged prepaid cards from a merchant store shelf, carefully removes the cards from the packaging, scans the magnetic strip, inserts the cards back in the package, and places the cards back on the shelf The thief then loads a blank card with the scanned card data and periodically checks the website of the card issuer to determine if the card has been activated by a consumer. An unsuspecting consumer then purchases the same "tampered with" card or cards. Once activated, the thief utilizes the counterfeit card to make purchases. Such scenarios reflect why prepaid cards are typically displayed from behind the counter or in a fairly secure location that can be easily watched, and why closed systems have traditionally been used.

Accordingly and beneficially, a tamper evident packaging container 81, according to an embodiment of the present invention, can make it difficult for a prospective thief to scan the transaction card 71 without causing easily recognized damage to the packaging container 81—warning the merchant and consumer not to activate the tampered-with card. Thus, the transaction card product 31 beneficially need not be displayed from "behind the counter," but can be positioned out on the main floor of the merchant establishment with minimal security.

According to a preferred configuration, the retail-packaging container 81 containing the transaction card 71 can include a product identification indicator 83 positioned on a first portion of the external surface of the container 81, and an account activation indicator 85 positioned on a second portion of the external surface of the container 81. The product identification indicator 83 can be collocated with the account activation indicator 85 or can be positioned spaced apart from the account activation indicator 85 as shown in FIG. 2A. According to the preferred configuration, the product identification indicator 83 can he in the form of a universal product code ("UPC") and/or a stock-keeping unit ("SKU"), which is scannable by a barcode reader/wand 63. The product identification indicator 83 can, however, alternatively be presented in other forms known to those skilled in the art to include text, RHD, etc. The product identification indicator 83 allows the merchant POS apparatus 37 to recognize the product being purchased—i.e., $50 prepaid card, $100 prepaid card, non-denominated prepaid card having a $500 limit, phone card, etc.

According to the preferred configuration, the account activation indicator 85 can be in the form of a magnetic strip 85 storing an assigned second unique transaction card identifier 89. The magnetic strip 85 is located along an edge of the packaging container 81, and the portion of the container carrying the magnetic strip 85 is sufficiently thin so that the respective portion of the container 81 carrying the magnetic strip 85 can be "swiped" through, and the transaction card identifier 89 read by, the magnetic strip reader/slot 65. Note, although the account activation indicator 85 was described in the form of a magnetic strip, other forms of indicator are within the scope of the present invention. For example, the account activation indicator 85 can be in the form of a barcode, or can be provided in the form of an RFID chip or contact memory as known to those skilled in the art.

The second unique transaction card identifier 89 is explicitly made different from the first transaction card identifier 75 so that a prospective thief having knowledge of the second unique transaction card identifier (e.g., by scanning the magnetic strip 85) would not readily have knowledge of the first transaction card identifier 75 or the associated unique transaction card transaction account number 77, thus, thwarting the previously described theft scenario.

According to the preferred embodiment of the transaction card product 31, the first unique transaction card identifier 75 preferably in the form of a transaction Primary Account Number ("PAN"), which can include a transaction Bank Identification Number ("BIN") 91 (also interchangeably referred to as an Issuer identifier Number ("IIN")), typically the first six digits of the PAN, for example, and which is used to identify the issuing bank or other issuer. The PAN can also include a unique number 92, typically a sequential number, for example, which can provide the "uniqueness" for the transaction card identifier/PAN, and a checksum digit 93. Other variations are, however, within the scope of the present invention. These numbers are used for routing payment information through the payment network 33 and for recognition of the transaction card transaction account/number 77, as known and understood by those skilled in the art.

Similarly, the second unique transaction card identifier 89 preferably in the form of an activation PAN including an activation BIN 95 used for routing activation information through the payment network 33, a unique number 96, and a checksum 97, which individually or collectively can be used for internal recognition of the transaction PAN of the first identifier 75 and/or the transaction card transaction account/number 77. That is, the transaction card identifier 75 (e.g., transaction PAN) can be linked with the activation card identifier 89 (e.g., activation PAN) to create a relationship so that when the activation PAN (e.g., activation BIN plus unique number) is presented in a transaction, it has a one-to-one relationship with the transaction (financial) card PAN (transaction BIN plus unique number).

According to the preferred configuration, in order to prevent unauthorized identification of the transaction PAN, the activation PAN is different from the transaction PAN and the activation BIN is preferably correspondingly different from that of the transaction BIN, but the unique transaction number 92 is either the same number or is otherwise in correspondence with the unique transaction number 96.

Further, according to the preferred configuration, the activation BIN 95 is issued and dedicated to use for "activation." The activation BIN 95 can be either financial (will settle transactions) or non-financial (will not settle transactions). A series of activation PANs can be generated from the activation BIN 95, which are separately assigned to a like number of transaction cards 71. Each generated activation PAN is then linked, for example, to a unique identifier on the card 71 (e.g., the transaction card identifier/PAN 75)

As indicated above, the second unique transaction card identifier 89 including or consisting of one of the generated activation PANs, the associated unique number 96, and/or the associated activation BIN 95, is either directly or indirectly associated with the first transaction card identifier 75, and thus, the unique transaction card transaction account/number 77 linked to the specific transaction card 71, so that the financial institution server 35 can activate the transaction card transaction account 77 (i.e., activate the card 71 and fund/allow access to the associated transaction account 77). Beneficially, due to such association/linking, the financial institution server 35 can perform at least portions of the activation process in response to receiving an indication of the PAN or unique number portion of the second transaction card identifier 89 without having first received the first transaction card identifier/TAN 75. I.e., the activation PAN can be provided solely for the purpose of "activating" the specific transaction card 71 while the card is still sealed in the packaging container 81, where the transaction PAN can be provided for transactional use of the card 71 after the account 77 has been activated and the card 71 removed from the packaging container 81.

As shown in FIG. 1, the system 30 can also include a database 55 stored, for example, in the memory 45 (internal or external, networked, or non-networked) of the server 35, as shown, for example, in FIG. 1, or stored in the memory of a database server (not shown). The database 55 can contain data related to the first transaction card identifier 75, the second transaction card identifier 89, the transaction card transaction account 77, and the UPC and/or SKU 83 of each of a plurality of transaction cards 71 and/or products 31.

According to one configuration of many different types of configurations known to those skilled in the art of computer systems, the database 55 can, for example, include or be in the form of a table (not shown) listing for each transaction card 71 and/or product 31, the transaction card transaction account/number 77, the first transaction card identifier 75, the second transaction card identifier 89, and optionally, the UPC and/or SKU 83 and/or the merchant name if delivered to or earmarked for a specific merchant. Note, rather than, or in addition to, the entire first or second transaction card identifier 75, 89, the table can separately include the transaction BIN 91, the unique number 92 portion of the transaction PAN, and the activation BIN 95 and/or unique number 96 portion of the activation PAN. If the unique number 92 is the same number as unique number 96, the table can include the transaction BIN 91, activation BIN 95, and the unique number 92/96 (in a single entry). Regardless, such table can allow the card issuer (e.g., via server 35) to readily determine the account/number 77 separately from either the transaction or activation PAN or associated first or second transaction card identifier 75, 89, respectively.

The system 30 can also include transaction card account activation and processing computer program product 101 stored, for example, in the memory 45 of the financial institution server 35, to manage transaction card activation and payment processing. Note, the program product 101 can be in the form of microcode, programs, routines, and symbolic languages that provide a specific set or sets of ordered operations that control the functioning of the hardware and direct its operation, as known and understood by those skilled in the art. Note also, the program product 101, according to an embodiment of the present invention, need not reside in its entirety in volatile memory of the server 35, but can be selectively loaded, as necessary, according to various methodologies as known and understood by those skilled in the art of computer systems.

The program product 101 can include a set of instructions that, when executed by the financial institution server 35, cause the server 35 to perform various operations, to include receiving activation request data including a first payment message from the merchant POS apparatus 37 responsive to either the customer or the merchant sliding the magnetic strip 85 through the magnetic strip reader/slot 65 of the merchant POS apparatus 37 to upload activation approval data to the merchant POS apparatus 37, receiving from the merchant POS apparatus 37, a second payment message defining a card purchase acknowledgment that the merchant POS apparatus 37 or a merchant associated therewith received from a purchasing customer, sufficient monetary funds to purchase the transaction card product 31, and completing activation of the transaction card 71 responsive to receiving the second payment message. The activation request data can include at least a portion of the second unique transaction card identifier 89, a flag indicating a capability of the merchant POS apparatus 37 to support partial-authorization messaging, and/or the transaction dollar amount. The activation approval data can include data indicating a partial authorization approval balance of, e.g., zero dollars, for the transaction card transaction account 77. The operation of completing activation of the account 77 can include transferring monetary hinds into the account 77 associated with the selected (purchased) transaction card 71, and retiring the second unique transaction card identifier 89 or PAN associated with the selected transaction card 71. The activation process, according to embodiments of the present invention, will be described in more detail below.

Figure 3:
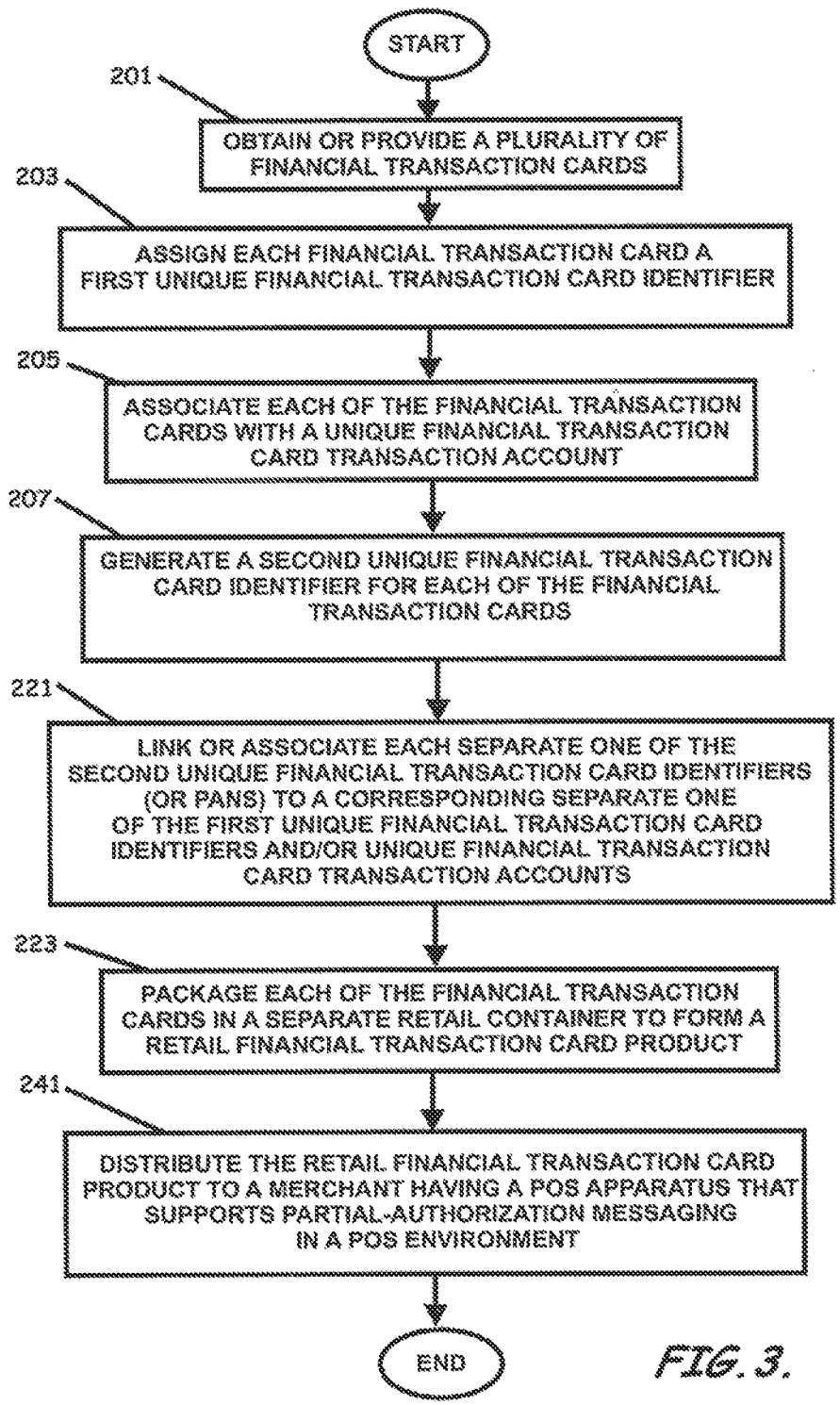
FIG. 3 is a schematic block flow diagram illustrating the steps of forming and delivering the transaction card product shown in FIGS. 2A-2B according to an embodiment of the present invention.

FIG. 3 provides a high-level flow diagram illustrating a method (and/or operations) for activating and processing the sale of a serialized transaction card product 31 over an existing payment network 33 utilizing partial-authorization messaging. For example, according to an embodiment of the present invention, the card issuer obtains or provides a plurality of transaction cards 71 such as, for example, gift or prepaid debit cards (block 201), and if not already accomplished, generates and/or assigns each transaction card 71 a first unique transaction card identifier 75 (e.g., financial transaction PAN) including a transaction BIN 91 and a unique "transaction" number 92 (block 203). The card issuer further associates each of the plurality of transaction cards 71 with a corresponding unique transaction card transaction account 77 identified by account number (block 205).

Figure 4:
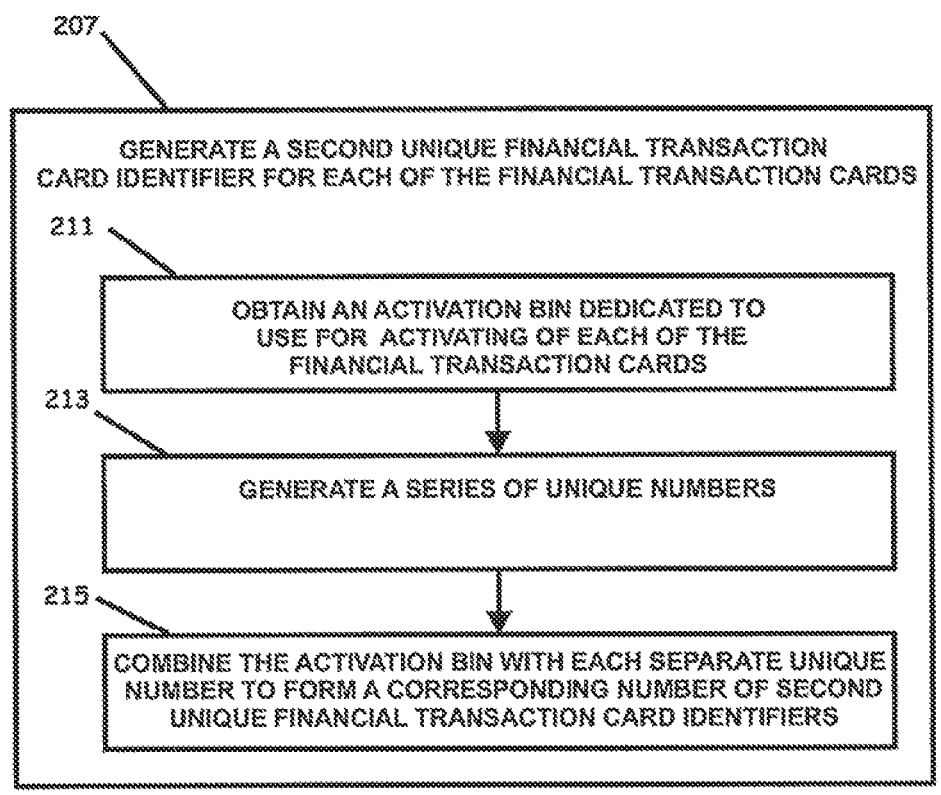
FIG. 4 is a schematic block flow diagram illustrating the steps for generating a second unique transaction card identifier for each of the transaction cards according to an embodiment of the present invention.

The card issuer also generates a second unique transaction card identifier 89 (e.g., activation PAN) for each of the transaction cards 71 (block 207). As shown in FIG. 4, generating a second transaction card identifier 89 for each of the transaction cards 71 can include obtaining a BIN 95 preferably dedicated to use for activating of each of the transaction cards 71 (block 211), generating a series of unique "activation" numbers 96 to be associated with the activation BIN 95 (block 213), and combining the activation BIN 95 with each separate one of the plurality of unique numbers 96 to form a corresponding number of second unique transaction. card identifiers (e.g., activation PANs) 89 (block 215).

As further shown in FIG. 3, each of the second transaction card identifiers 89 or PANs can be linked or associated to a corresponding separate one of the first unique transaction card identifiers 75 directly and/or indirectly via association with an associated unique transaction card transaction account 77 (block 221), which, in turn, is associated with a respective first unique transaction card identifier 75. Also, each of the transaction cards 71 are packed in a separate retail packaging container 81 to form a retail transaction card product 31 (block 223). Note, the steps/operations associated with blocks 203, 205, 207, and 221, are normally performed, at least in part, by server 35.

Figure 5:
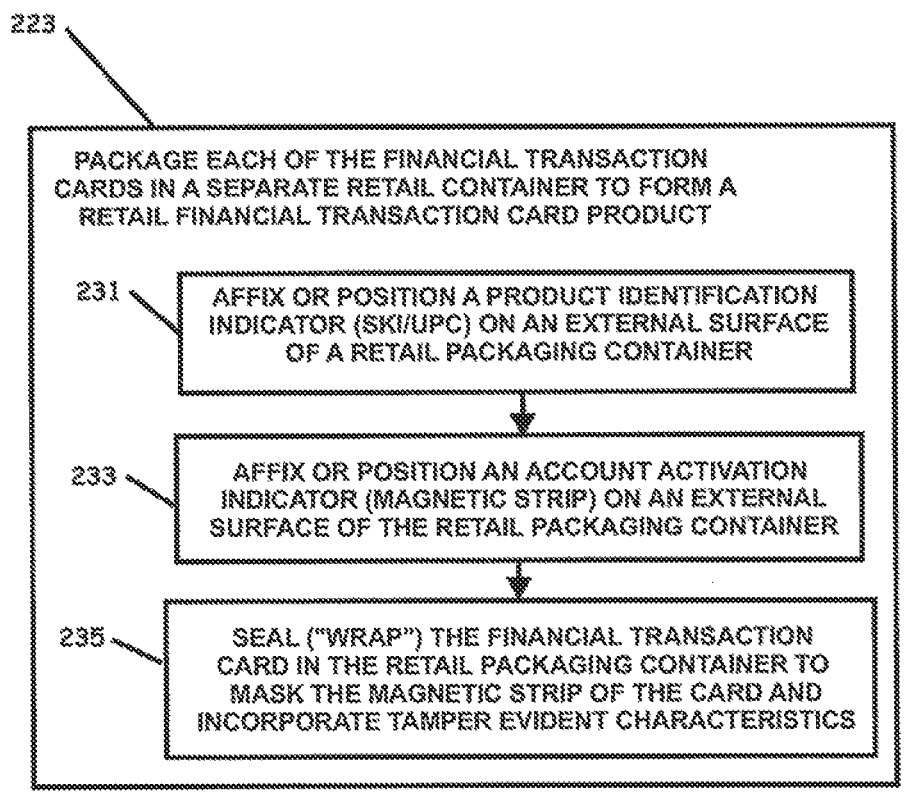
FIG. 5 is a schematic block flow diagram illustrating the steps for packaging each of the transaction cards in a separate retail container to form a retail transaction card product according to an embodiment of the present invention.

As shown in FIG. 5, prior to or at some time very shortly after "wrapping" each transaction card 71 in its respective packaging container 81, if not already accomplished, as part of the step of packaging the transaction cards 71, a product identification indicator 83 bar code) is affixed to the container 81 (block 231). An account activation indicator 85 (e.g., magnetic strip or other storage device) containing or otherwise configured to contain indicia of an assigned second unique transaction card identifier 89, is also affixed to the container 81 (block 233). The packaging container 81 is sealed to mask the magnetic strip 73 or other account identification storage medium of the respective transaction card 71 and to incorporate tamper evident characteristics that readily indicate to the merchant if an unauthorized attempt has been made to physically access the transaction card 71 from within the packaging container 81, prior to purchase (block 235).

As further shown in FIG. 3, the transaction card product 31 is distributed to a merchant having a POS apparatus 37 that supports partial-authorization messaging in a POS environment (block 241).

Figure 6:
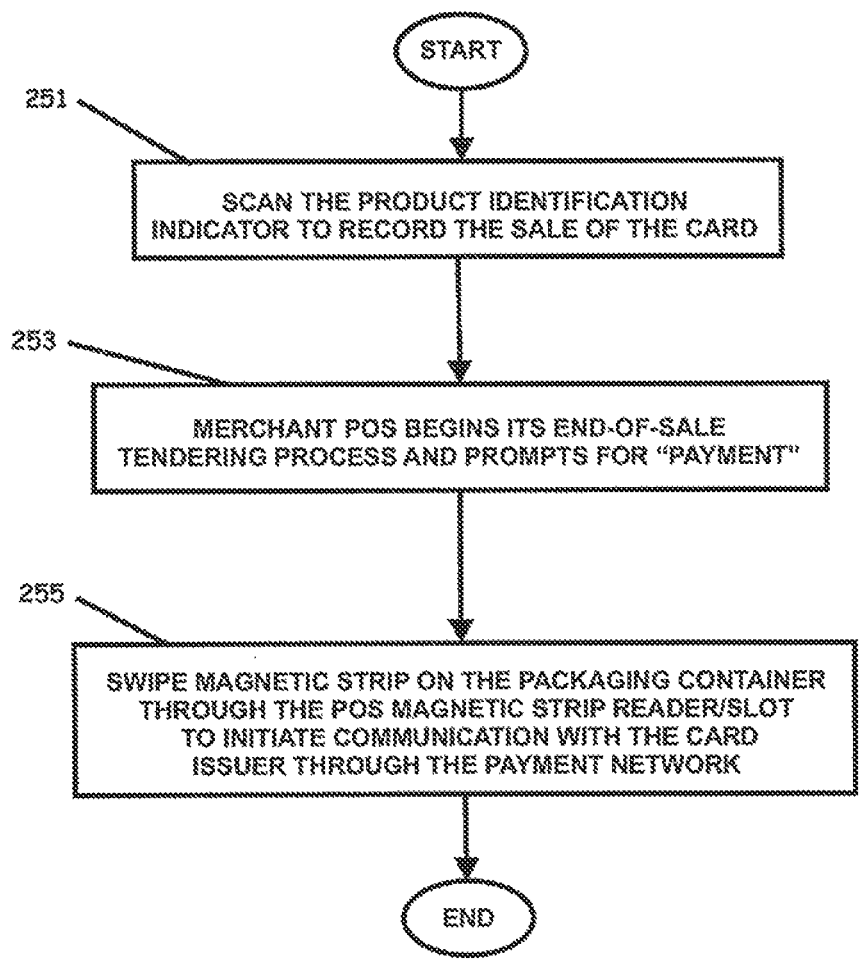
FIG. 6 is a schematic block flow diagram illustrating the steps for processing the transaction card package at the merchant POS according to an embodiment of the present invention.
Figure 7:
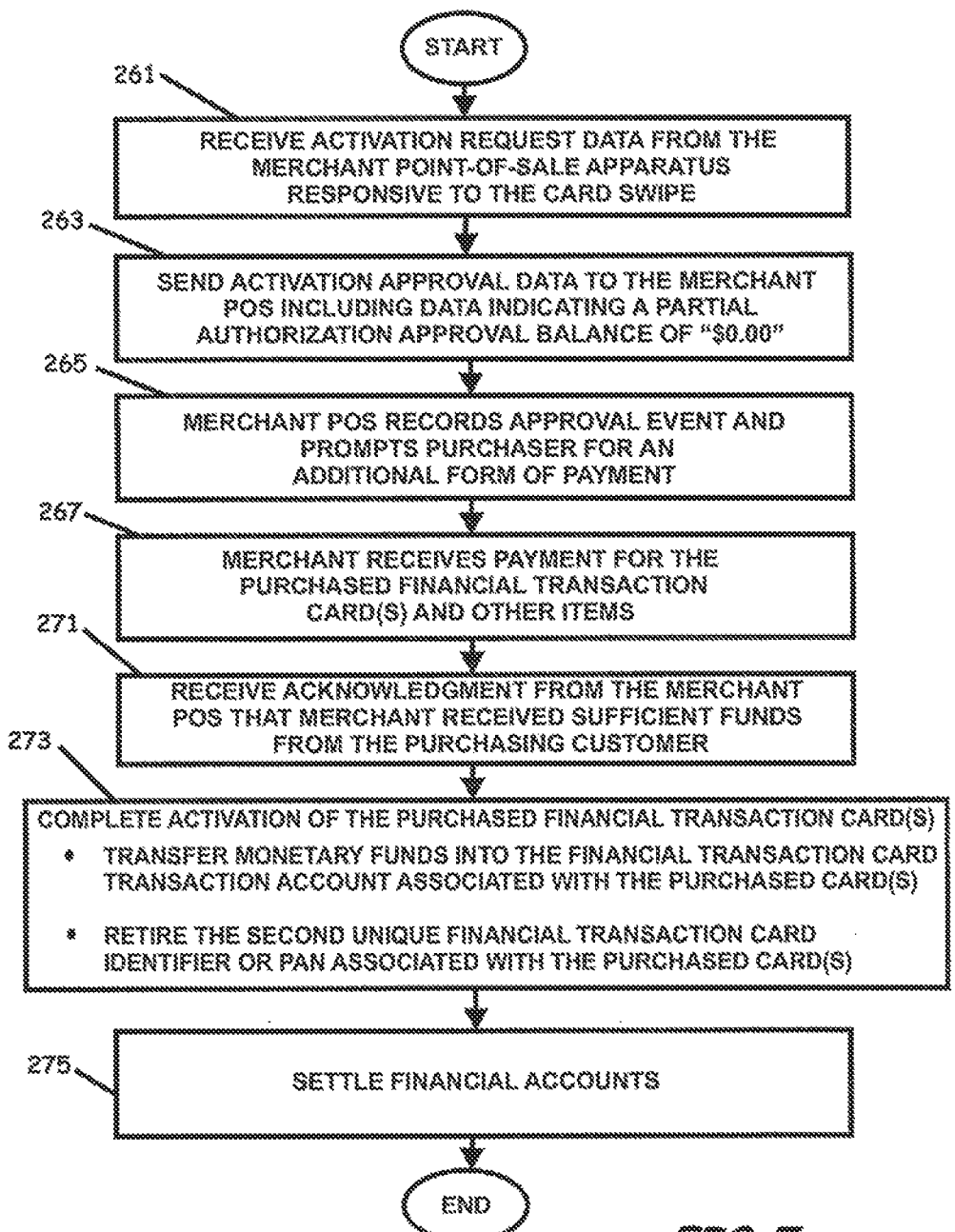
FIG. 7 is a schematic flow diagram illustrating the steps activating the transaction card using partial authorization messaging according to an embodiment of the present invention.

As shown in FIG. 6, to purchase a transaction card 71, a customer brings a card product 31 to the POS checkout counter, for example. The merchant scans the product identification indicator 83, e.g., 12 digit UPC, to record the sale of the card 71 (block 251). The card 71 may be a pre-denominated (e.g., $25 gift card) for an open denominated card at which point the POS apparatus 37, according to an embodiment of the present invention, will prompt for that amount. At the end of purchase process, the merchant POS apparatus 37 begins its end-of-sale tendering process and prompts for "payment" (block 253). The first "payment" presented should be a "swipe" of the magnetic strip 85 of the card product 31 through the magnetic strip reader/slot 65 of the POS apparatus 37 (block 255), which begins communication with the institution server 35 through the payment network 33.

As shown in HG. 7, the financial institution server 35 receives the activation request data from the merchant POS apparatus 37 (block 261) responsive to a user interfacing the magnetic strip 85 or other account activation indicator with the merchant POS apparatus 37. The activation request data provided to the server 35 can include at least a portion of the second unique transaction card identifier 89 (e.g., the respective activation PAN) assigned to the respective transaction card 71 to be purchased and a flag indicating a capability of the merchant POS apparatus 37 to support partial-authorization messaging. The data can also include the transaction amount (e.g. $25 for a $25 gift card). In an alternative embodiment of the present invention, the transaction amount can include a value to be added to the transaction card 71 associated with a transaction account 77 that has been originated with, for example, a zero balance, pending activation of the associated transaction card 71.

In response to the activation PAN, for example, the server 35 sends activation approval data to the merchant POS apparatus 37 (block 263). The activation approval data can include data indicating that the "card issuer" "approves" the transaction, but rather than responding with the card face or requested value, responds with a partial authorization available balance of, e.g., "$0.00," for the respective transaction card 71 to be purchased. The merchant POS apparatus 37 records this event and then prompts the purchaser for an additional form of payment (block 265). Note, the steps/operations indicated by 255, 261, 263, and 265, can be repeated for the purchase of multiple transaction cards 71 sold in a single POS transaction. After each magnetic strip 85 of each transaction card product 31 to be purchased has been swiped, the customer is expected to provide, and the merchant is expected to receive, a valid additional form of payment (block 267).

Once the server 35 receives an acknowledgment from the merchant POS apparatus 37 that the merchant received sufficient funds from the purchasing customer (block 271), the server 35 completes activation of the purchased card 71 (block 273). This can include transferring monetary funds into the respective transaction card's transaction account 77 associated with the selected transaction card 71, and retiring the second unique transaction card identifier 89 or PAN associated with the respective purchased transaction card 71. The card issuer or financial institution (if not the issuer) and merchant then settle the accounts based on the amount of value added or otherwise provide to the transaction card 71 (i.e., account 77), along with any contract fees (block 275).

Figure 8:
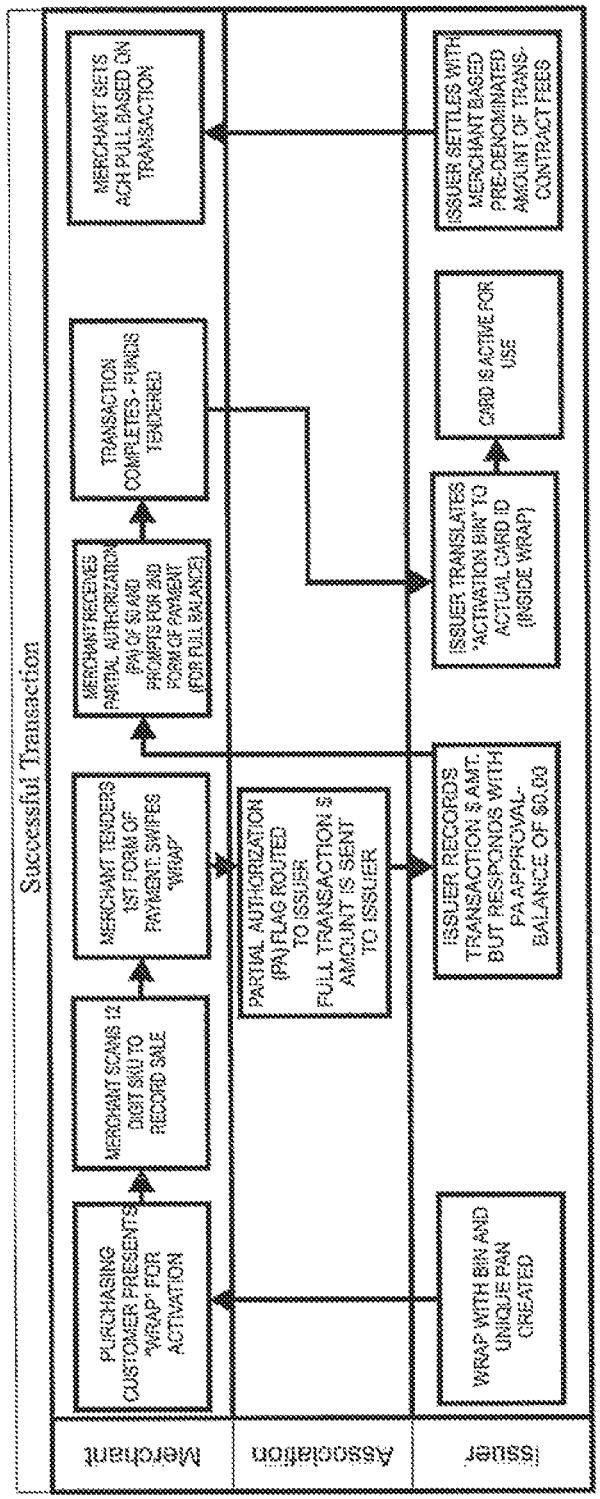
FIG. 8 is a schematic block flow diagram illustrating a "successful transaction" scenario for a method of activating and processing the sale of a serialized transaction card product over an existing payment network utilizing partial-authorization messaging according to an embodiment of the present invention.

FIG. 8 illustrates an exemplary scenario that summarizes many of the steps/operations of the process described in FIGS. 3-7, whereby the transaction (activation/funding of the card 71) is successful, This illustration includes the physical transfer of the transaction card product 31, and includes an exemplary dataflow between the merchant and the card issuer (e.g., via server 35), to include post-activation settlement. Particularly, with respect to the post activation settlement, FIG. 8 further illustrates the scenario whereby, having activated the transaction card 71 via partial-authorization messaging, the steps/operations can further include the card issuer settling funds directly (merchant bank to issuing bank) to acquire the customer's value from the merchant to fund the card account, rather than through use of the card issuer's distributor. That is, responsive to the partial-authorization which placed the merchant in a position to apply a separate tender via a standard payment transaction to pay for the "value sold", the issuer advantageously can settle directly with the merchant, e.g., via ACH, for the pre-denominated amount of the transaction plus contract fees.

Figure 9:
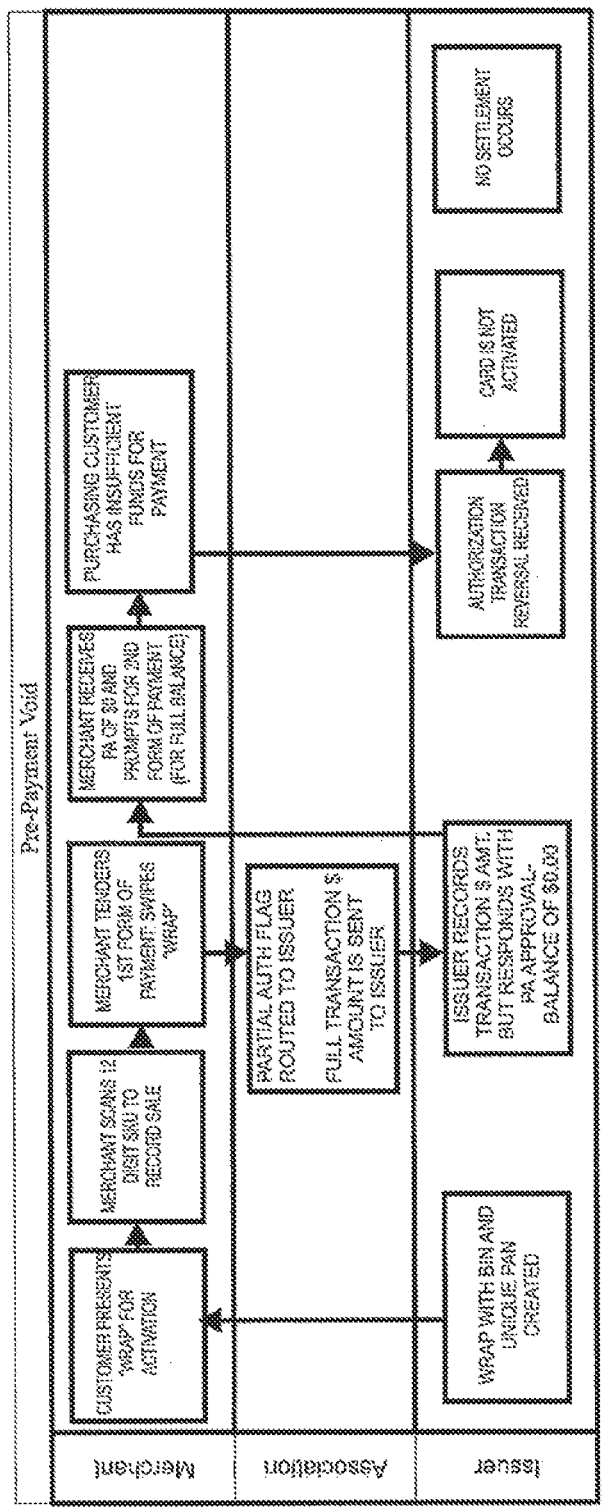
FIG. 9 is a schematic block flow diagram illustrating a "pre-payment void" scenario according to an embodiment of the present invention.

FIG. 9 illustrates a scenario where the purchasing consumer is unable to produce sufficient funds to pay for the transaction card 71 at the second payment prompt. In such scenario, either via a timeout, or via communication with the merchant POS apparatus 37 which provides a request to reverse the partial authorization transaction, the server 35 responsively interrupts, or does not otherwise continue, the activation process and no settlement occurs.

Figure 10:
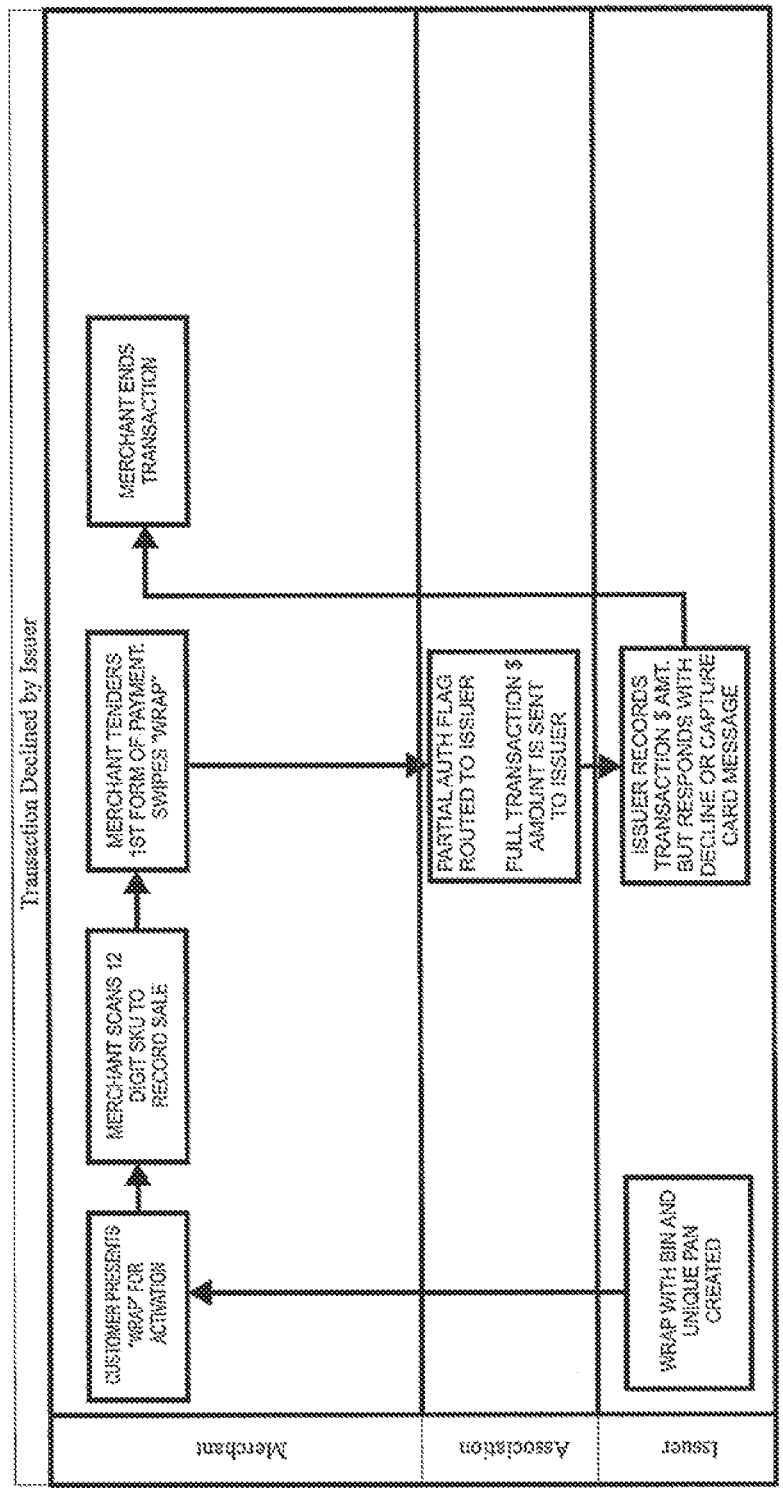
FIG. 10 is a schematic block flow diagram illustrating a "transaction declined by issuer" scenario according to an embodiment of the present invention.

FIG. 10 illustrates a scenario where the transaction is declined by the card issuer. For example, the transaction card package 31 may have been reported stolen, the merchant may no longer in good standing financially with the issuer, or any number of other reasons known to those skilled in the art, may result in a need to decline the transaction.

Figure 11:
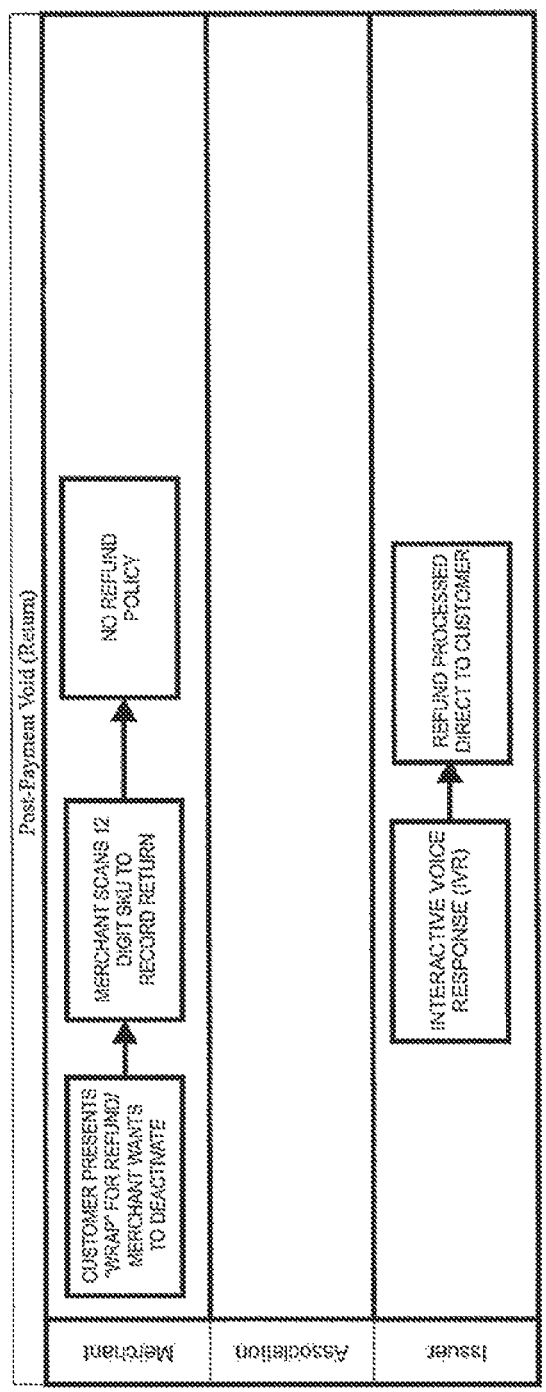
FIG. 11 is a schematic block flow diagram illustrating a "post-payment void (product returned)" scenario according to an embodiment of the present invention.

FIG. 11 illustrates a scenario where the purchasing customer wishes to return the preferably unopened transaction card package 31, but the merchant has a no refund policy. In such scenario, the merchant secures the package 31 and provides the purchasing customer a telephone number to the issuer to request a refund. Preferably through an interactive voice response system (not shown), the refund is processed directly to the purchasing customer.

It is important to note that while embodiments of the present invention have been described in the context of a fully functional system, those skilled in the art will appreciate that the mechanism of at least portions of the present invention and/or aspects thereof are capable of being distributed in the form of a computer readable medium in a variety of forms storing a set of instructions for execution on a processor, processors, or the like, and that embodiments of the present invention apply equally regardless of the particular type of signal bearing media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and certain types of transmission type media such as, for example, certain digital and analog communication links capable of storing the set of instructions. Such media can contain, for example, both operating instructions and the operations instructions related to the program product 101 and the computer executable portions of the method steps/operations, described above.

Accordingly, an embodiment of the present invention can include a computer readable medium that is readable by a computer, e.g., server 35, to manage transaction card activation and payment processing. The computer readable medium can include a set of instructions (e.g., program product 101 and/or above described method steps/operations in computer readable form) that, when executed by the server 35, cause the server 35 to perform various operations, including the operations of receiving activation request data including a first payment message from the merchant POS apparatus 37 over the payment network 33 in response to either the customer or the merchant sliding the magnetic strip 85 through the magnetic strip reader/slot 65 of the merchant POS apparatus 37, which can result in an automated transmission thereto, and sending activation approval data to the merchant POS apparatus 37 over the payment network 33.

The activation request data associated with the first payment message can include at least a portion of the second unique transaction card identifier 89, a flag indicating a capability of the merchant POS apparatus 37 to support partial-authorization messaging, and/or the transaction dollar amount. The activation approval data can correspondingly include data indicating a partial authorization approval balance of, e.g., zero dollars, for the transaction card transaction account 77.

The operations can also include receiving from the merchant POS apparatus 37 over the payment network 33, a second payment message defining a card purchase acknowledgment that the merchant POS apparatus 37 or a merchant associated therewith received from a purchasing customer, sufficient monetary funds to purchase the transaction card product 31, and can include completing activation of the transaction card 71 responsive to receiving the second payment message. The operation of completing activation of the account 77 can include transferring monetary funds into the account 77 associated with the selected (purchased) transaction card 71, and retiring the second unique transaction card identifier 89 or activation PAN associated with the selected transaction card 71. Additional details of the activation process, according to embodiments of the present invention, were described above.

In the drawings and specification, there have been disclosed typical preferred embodiments of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. A computer associated with a financial institution for activating a serialized transaction card product over an open electronic financial payment network utilizing partial-authorization messaging, the computer comprising:
    one or more input/output units;
    one or more processors;
    one or more non-transitory memories having one or more computer programs stored therein, the one or more computer programs operable to cause the one or more processors to perform the steps of:
        associating each of a plurality of transaction cards with one of a plurality of first unique identifiers and with one of a plurality of second unique identifiers, the plurality of first identifiers comprising a transaction Bank Identification Number ("BIN") and the plurality of second identifiers comprising an activation BIN different from the transaction BIN,
        determining receipt of activation request data, the activation request data including one or more of the plurality of second unique identifiers and a flag indicating a capability of a payment interface associated with a merchant to support partial-authorization messaging, the activation request data being sent through an open electronic financial payment network from one or more of a plurality of merchant acquirer computers associated with the merchant; and
        activating, by the computer, the selected transaction card product associated with the activation request data responsive to receipt of one or more transaction messages sent through the electronic financial payment network from the one or more of the plurality of merchant acquirer computers indicating a purchase acknowledgement of the selected transaction card product.

2. A computer as defined in claim 1, wherein the steps further include:
    sending via the electronic financial payment network responsive to the determining receipt of the activation request data, partial-authorization approval data to the one or more of the plurality of merchant acquirer computers to thereby use the partial authorization messaging to facilitate the activation of the selected one of the plurality of retail transaction card products using the electronic financial payment network, wherein the partial-authorization approval data includes a partial authorization approval balance of zero dollars available to thereby indicate a requirement to tender funds to complete activation of the selected transaction card product associated with the activation request data.

3. A computer-assisted method of activating a serialized transaction card product over an open electronic financial payment network utilizing partial-authorization messaging, the method comprising the steps of:
    associating, by a computer, each of a plurality of transaction cards with one of a plurality of first unique identifiers and with one of a plurality of second unique identifiers, the plurality of first identifiers comprising a transaction Bank Identification Number ("BIN") and the plurality of second identifiers comprising an activation BIN different from the transaction BIN,
    packaging each of the plurality of transaction cards in a respective container of a plurality of containers, each container including indicia of one of the plurality of second unique identifiers,
    determining, by the computer, receipt of activation request data, the activation request data including one or more of the plurality of second unique identifiers and a flag indicating a capability of a payment interface associated with a merchant to support partial-authorization messaging, the activation request data being sent through an open electronic financial payment network from one or more of a plurality of merchant acquirer computers associated with the merchant;
    activating, by the computer, a selected transaction card product associated with the activation request data responsive to receipt of one or more transaction messages sent through the electronic financial payment network from the one or more of the plurality of merchant acquirer computers indicating a purchase acknowledgement of the selected transaction card product.

4. A method as defined in claim 3, wherein the method further includes the step of:
    sending, by the computer via the electronic financial payment network responsive to the determining receipt of the activation request data, partial-authorization approval data to the one or more of the plurality of merchant acquirer computers to thereby use the partial authorization messaging to facilitate the activation of the selected one of the plurality of retail transaction card products using the electronic financial payment network;

and wherein the activating is responsive to the sending step.

5. A method as defined in claim 3, wherein the step of packaging each of the plurality of cards includes the steps of:

positioning a product identification indicator on a first portion of an external surface of the respective container; and positioning an account activation indicator on a second portion of the external surface of the respective container, the account activation indicator including the respective assigned second unique transaction card identifier.

6. A method as defined in claim 3, wherein the step of completing activation of the selected transaction card comprises the steps of:

transferring monetary funds into a transaction card transaction account associated with the selected transaction card product; and retiring the second unique transaction card identifier associated with the selected transaction card.

7. Non-transitory computer readable memory having one or more computer programs stored therein, the one or more computer programs comprising instructions operable to cause a computer associated with a financial institution to perform the steps of:

associating each of a plurality of transaction cards with one of a plurality of first unique identifiers and with one of a plurality of second unique identifiers, the plurality of first identifiers comprising a transaction Bank Identification Number ("BIN") and the plurality of second identifiers comprising an activation BIN different from the transaction BIN;

determining receipt of activation request data, the activation request data including one or more of the plurality of second unique identifiers and a flag indicating a capability of a payment interface associated with a merchant to support partial-authorization messaging, the activation request data being sent through an open electronic financial payment network from one or more of a plurality of merchant acquirer computers associated with the merchant;

activating, by the computer, the selected transaction card product associated with the activation request data responsive to receipt of one or more transaction messages sent through the electronic financial payment network from the one or more of the plurality of merchant acquirer computers indicating a purchase acknowledgement of the selected transaction card product.

8. Non-transitory memory as defined in claim 7, wherein the payment interface is a Point of Sale (POS) magnetic strip card reader slot adapted to read magnetic card strips.

9. Non-transitory memory as defined in claim 7, the one or more compute programs further comprising instructions operable to cause a computer associated with a financial institution to perform the steps of:

sending via the electronic financial payment network responsive to the determining receipt of the activation request data, partial-authorization approval data to the one or more of the plurality of merchant acquirer computers to thereby use the partial authorization messaging to facilitate the activation of the selected one of the plurality of retail transaction card products using the electronic financial payment network, wherein the partial-authorization approval data includes a partial authorization approval balance of zero dollars available to thereby indicate a requirement to tender funds to complete activation of the selected transaction card product associated with the activation request data.

10. Non-transitory memory as defined in claim 7, the one or more compute programs further comprising instructions operable to cause a computer associated with a financial institution to perform the steps of:

sending, by the computer via the electronic financial payment network responsive to the determining receipt of the activation request data, partial-authorization approval data to the one or more of the plurality of merchant acquirer computers to thereby use the partial authorization messaging to facilitate the activation of the selected one of the plurality of retail transaction card products using the electronic financial payment network;

and wherein the activating is responsive to the sending step.

11. Non-transitory memory as defined in claim 7, the one or more compute programs further comprising instructions operable to cause a computer associated with a financial institution to perform the steps of:

transferring monetary funds into a transaction card transaction account associated with the selected transaction card product; and retiring the second unique transaction card identifier associated with the selected transaction card.

* * * * *